(12) United States Patent
Kitahara et al.

(10) Patent No.: US 12,158,580 B2
(45) Date of Patent: Dec. 3, 2024

(54) LIGHT SOURCE UNIT AND IMAGE DISPLAY DEVICE

(71) Applicant: NICHIA CORPORATION, Anan (JP)

(72) Inventors: Wataru Kitahara, Kamiina-gun (JP); Takanori Aruga, Suwa-gun (JP); Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/513,895

(22) Filed: Nov. 20, 2023

(65) Prior Publication Data

US 2024/0184109 A1    Jun. 6, 2024

(30) Foreign Application Priority Data

Dec. 5, 2022   (JP) .................................. 2022-194460

(51) Int. Cl.
*G02B 27/01*     (2006.01)
*G02B 5/30*      (2006.01)
(Continued)

(52) U.S. Cl.
CPC ....... *G02B 27/0101* (2013.01); *G02B 5/3083* (2013.01); *G02B 27/0983* (2013.01); *G02B 27/283* (2013.01)

(58) Field of Classification Search
CPC .............. G02B 27/0101; G02B 5/3083; G02B 27/0983; G02B 27/283
See application file for complete search history.

(56) References Cited

U.S. PATENT DOCUMENTS

| 5,764,407 A | 6/1998 | Nanba |
| 10,606,075 B2 | 3/2020 | Choi et al. |

(Continued)

FOREIGN PATENT DOCUMENTS

| JP | H03-273943 A | 12/1991 |
| JP | H06-347708 A | 12/1994 |

(Continued)

OTHER PUBLICATIONS

U.S. Appl. No. 18/496,594, filed Oct. 27, 2023, Kitahara et al.
(Continued)

*Primary Examiner* — Sejoon Ahn
(74) *Attorney, Agent, or Firm* — Foley & Lardner LLP

(57) ABSTRACT

A light source unit includes a display device configured to display an image, a reflective polarizing element on which light emitted from the display device is incident, a reflecting member, and a waveplate. The reflective polarizing element transmits a first polarized light and reflects a second polarized light. The reflecting member reflects, toward the reflective polarizing element, light transmitted by the reflective polarizing element. The waveplate is interposed in a portion of an optical path between the reflective polarizing element and the reflecting member. The optical path is of light emitted from the display device, transmitted by the reflective polarizing element, reflected by the reflecting member, and reflected by the reflective polarizing element. A normal of the waveplate is tilted with respect to a direction of the optical path transmitted by the waveplate partway from the reflective polarizing element toward the reflecting member.

22 Claims, 11 Drawing Sheets

(51) Int. Cl.
    *G02B 27/09*    (2006.01)
    *G02B 27/28*    (2006.01)

(56) References Cited

U.S. PATENT DOCUMENTS

| | | |
|---|---|---|
| 11,169,377 B1 | 11/2021 | Chen |
| 11,287,649 B2 | 3/2022 | Hong |
| 2003/0035232 A1 | 2/2003 | Sasaki |
| 2003/0107716 A1 | 6/2003 | Ogawa |
| 2004/0145814 A1 | 7/2004 | Rogers |
| 2005/0007593 A1 | 1/2005 | Lebens |
| 2005/0052617 A1 | 3/2005 | Fujikawa et al. |
| 2008/0316606 A1 | 12/2008 | Inoguchi et al. |
| 2010/0109977 A1 | 5/2010 | Yamazaki et al. |
| 2010/0271396 A1 | 10/2010 | Nemeth et al. |
| 2011/0164311 A1 | 7/2011 | Morikuni |
| 2015/0378104 A1 | 12/2015 | Takahashi |
| 2017/0146803 A1 | 5/2017 | Kishigami et al. |
| 2018/0024335 A1 | 1/2018 | Uehara |
| 2018/0039077 A1 | 2/2018 | Kuzuhara et al. |
| 2018/0352204 A1 | 12/2018 | Fujita |
| 2018/0358339 A1 | 12/2018 | Iguchi |
| 2019/0011712 A1 | 1/2019 | Nagano et al. |
| 2019/0049725 A1 | 2/2019 | Kondo et al. |
| 2019/0061525 A1* | 2/2019 | Ji ............................ A61B 5/163 |
| 2019/0061638 A1* | 2/2019 | Hisatsugu ............... B60R 11/02 |
| 2019/0071014 A1* | 3/2019 | Misu .................. G02B 27/0101 |
| 2019/0072764 A1* | 3/2019 | Lee ....................... G02B 17/023 |
| 2019/0072799 A1* | 3/2019 | Narushima ............... G02B 5/30 |
| 2019/0073828 A1* | 3/2019 | Oiwa ....................... G06T 19/20 |
| 2020/0201036 A1 | 6/2020 | Hong |
| 2020/0271927 A1 | 8/2020 | Kawana |
| 2020/0319456 A1 | 10/2020 | Yatsu et al. |
| 2020/0333608 A1 | 10/2020 | Katagiri et al. |
| 2021/0239989 A1 | 8/2021 | Ide et al. |
| 2021/0325700 A1 | 10/2021 | Chen |
| 2021/0373331 A1 | 12/2021 | Gu et al. |
| 2021/0382304 A1 | 12/2021 | You et al. |
| 2022/0035165 A1 | 2/2022 | Takeda et al. |
| 2022/0138916 A1 | 5/2022 | Takagi et al. |
| 2022/0365266 A1 | 11/2022 | Cheng et al. |
| 2022/0365345 A1 | 11/2022 | Hamada |
| 2023/0026137 A1 | 1/2023 | Kusafuka et al. |
| 2023/0118416 A1 | 4/2023 | Hirata et al. |
| 2023/0415576 A1 | 12/2023 | Zozgornik |
| 2024/0061240 A1 | 2/2024 | Hirata et al. |

FOREIGN PATENT DOCUMENTS

| | | |
|---|---|---|
| JP | H07-140918 A | 6/1995 |
| JP | H07-306377 A | 11/1995 |
| JP | H09-200651 A | 7/1997 |
| JP | H10-274740 A | 10/1998 |
| JP | 2003-005073 A | 1/2003 |
| JP | 2003-043360 A | 2/2003 |
| JP | 2003-177320 A | 6/2003 |
| JP | 2004-045718 A | 2/2004 |
| JP | 2004-527801 A | 9/2004 |
| JP | 2005-070255 A | 3/2005 |
| JP | 2009-003128 A | 1/2009 |
| JP | 2009-251194 A | 10/2009 |
| JP | 2010-107873 A | 5/2010 |
| JP | 2011-138086 A | 7/2011 |
| JP | 2013-183042 A | 9/2013 |
| JP | 2016-033867 A | 3/2016 |
| JP | 2016-102810 A | 6/2016 |
| JP | 2016-148829 A | 8/2016 |
| JP | 2017-037304 A | 2/2017 |
| JP | 2017-049371 A | 3/2017 |
| JP | 2019-073272 A | 5/2019 |
| JP | 2019-095690 A | 6/2019 |
| JP | 2020-012986 A | 1/2020 |
| JP | 2020-074005 A | 5/2020 |
| JP | 2020-144184 A | 9/2020 |
| JP | 6809441 B2 | 1/2021 |
| JP | 2021-124527 A | 8/2021 |
| JP | 2021-162801 A | 10/2021 |
| JP | 2021-529332 A | 10/2021 |
| JP | 2022-025889 A | 2/2022 |
| JP | 2022-073094 A | 5/2022 |
| JP | 2022-129223 A | 9/2022 |
| WO | WO-2015/190157 A1 | 12/2015 |
| WO | WO-2016/103418 A1 | 6/2016 |
| WO | WO-2016/208195 A1 | 12/2016 |
| WO | WO-2017/138242 A1 | 8/2017 |
| WO | WO-2017/154360 A1 | 9/2017 |
| WO | WO-2017/170702 A1 | 10/2017 |
| WO | WO-2019/008684 A1 | 1/2019 |
| WO | WO-2019/130860 A1 | 7/2019 |
| WO | WO-2019/130944 A1 | 7/2019 |
| WO | WO-2021/054277 A1 | 3/2021 |
| WO | WO-2021/065820 A1 | 4/2021 |
| WO | WO-2021/106689 A1 | 6/2021 |

OTHER PUBLICATIONS

U.S. Appl. No. 18/511,505, filed Nov. 16, 2023, Kitahara et al.
U.S. Appl. No. 18/390,954, filed Dec. 20, 2023, Kitahara et al.
U.S. Appl. No. 18/538,112, filed Dec. 13, 2023, Aruga et al.
U.S. Appl. No. 18/543,762, filed Dec. 18, 2023, Kitahara et al.
Non-Final Office Action in U.S. Appl. No. 18/496,594 DTD Jul. 11, 2024.

* cited by examiner

LIGHT SOURCE UNIT AND IMAGE DISPLAY DEVICE

CROSS-REFERENCE TO RELATED APPLICATIONS

This application is based upon and claims priority to Japanese Patent Application No. 2022-194460, filed on Dec. 5, 2022, the entire contents of which are incorporated herein by reference.

FIELD

Embodiments relate to a light source unit and an image display device.

BACKGROUND

International Publication No. 2016/208195 discusses technology in which light emitted from a display device configured to display an image is sequentially reflected by multiple mirrors, and the light reflected by the final mirror is further reflected toward a user by a reflecting member such as a windshield or the like, thereby causing the user to view a virtual image corresponding to the image displayed by the display device.

SUMMARY

Embodiments of the invention are directed to a light source unit and an image display device that can display a high-quality image.

According to one aspect of the present invention, a light source unit includes a display device configured to display an image, a reflective polarizing element on which light emitted from the display device is incident, a reflecting member, and a waveplate. The reflective polarizing element transmits a first polarized light and reflects a second polarized light. The reflecting member reflects, toward the reflective polarizing element, light transmitted by the reflective polarizing element. The waveplate is interposed in a portion of an optical path between the reflective polarizing element and the reflecting member. The optical path is of light emitted from the display device, transmitted by the reflective polarizing element, reflected by the reflecting member, and reflected by the reflective polarizing element. A normal of the waveplate is tilted with respect to a direction of the optical path transmitted by the waveplate partway from the reflective polarizing element toward the reflecting member.

According to one aspect of the present invention, a light source unit includes a display device configured to display an image, a reflective polarizing element on which light emitted from the display device is incident, a reflecting member, and a waveplate. The reflective polarizing element reflects a first polarized light and transmits a second polarized light. The reflecting member reflects, toward the reflective polarizing element, light reflected by the reflective polarizing element. The waveplate is interposed in a portion of an optical path between the reflective polarizing element and the reflecting member. The optical path is of light emitted from the display device, reflected by the reflective polarizing element, reflected by the reflecting member, and transmitted by the reflective polarizing element. The normal of the waveplate is tilted with respect to a direction of the optical path transmitted by the waveplate partway from the reflective polarizing element toward the reflecting member.

According to one aspect of the present invention, an image display device includes the light source unit, and a reflection unit reflecting light emitted from the light source unit. The first image is formed between the light source unit and the reflection unit. A viewer is able to view a second image by light reflected by the reflection unit being reflected by a reflecting surface to be incident on an eyebox of the viewer. The reflecting surface is arranged to face the eyebox. The second image corresponds to the image.

According to embodiments of the invention, a light source unit and an image display device that can display a high-quality image can be provided.

DETAILED DESCRIPTION

Figure 1:
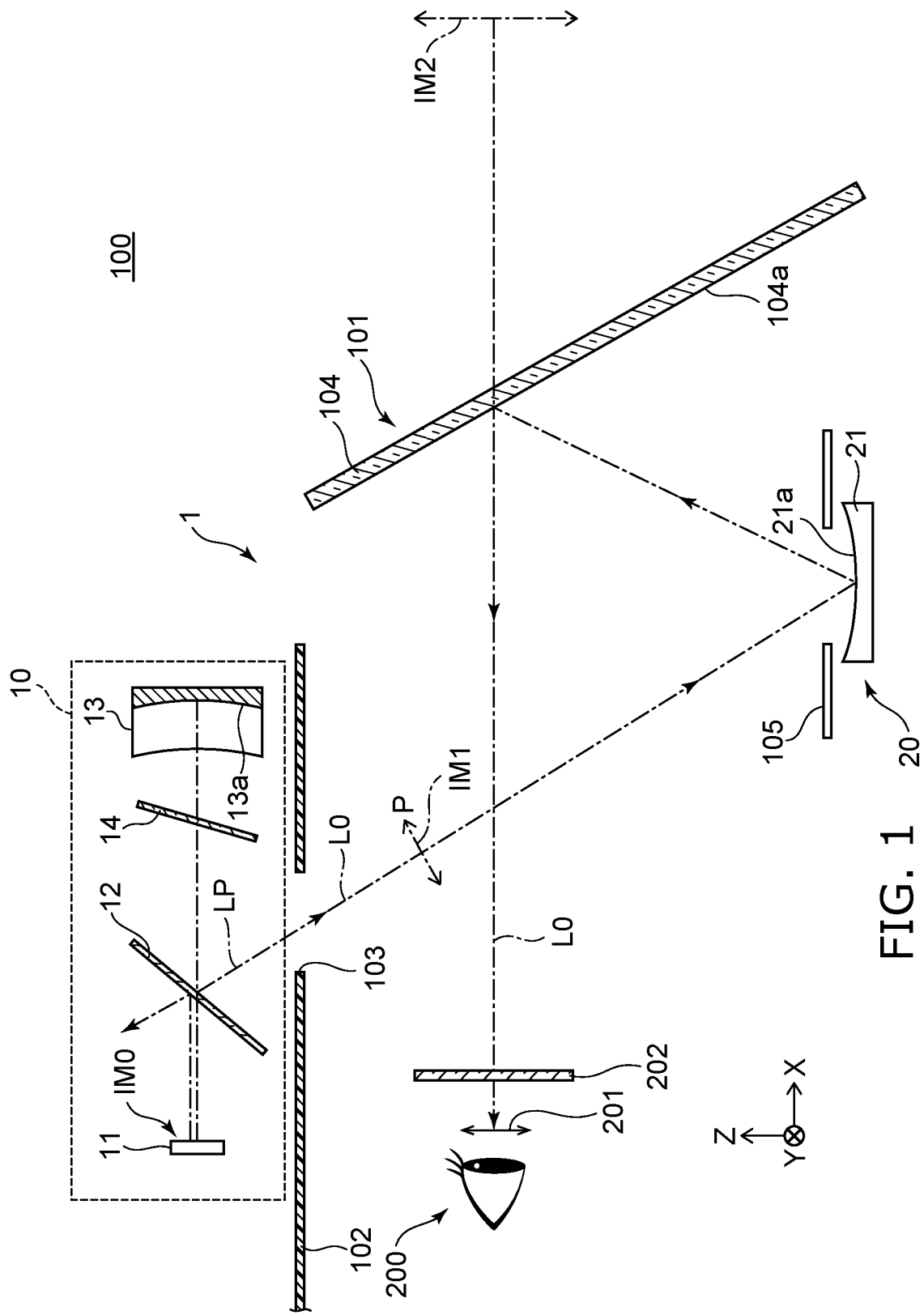
FIG. 1 is an end view showing an image display device according to a first embodiment.

Exemplary embodiments will now be described with reference to the drawings. The drawings are schematic or conceptual, and are simplified or enhanced as appropriate. For example, the aspect ratio of each portion, the proportions of sizes among portions, etc., are not necessarily the same as the actual values. Furthermore, the dimensions and proportional coefficients may be illustrated differently among drawings, even for identical portions. In the specification of the application and the drawings, components similar to those described in regard to a previous drawing are marked with like reference numerals, and a repeated detailed description is omitted as appropriate.

First Embodiment

Overall Configuration and Operation

FIG. 1 is an end view showing an image display device according to the embodiment.

Figure 2:
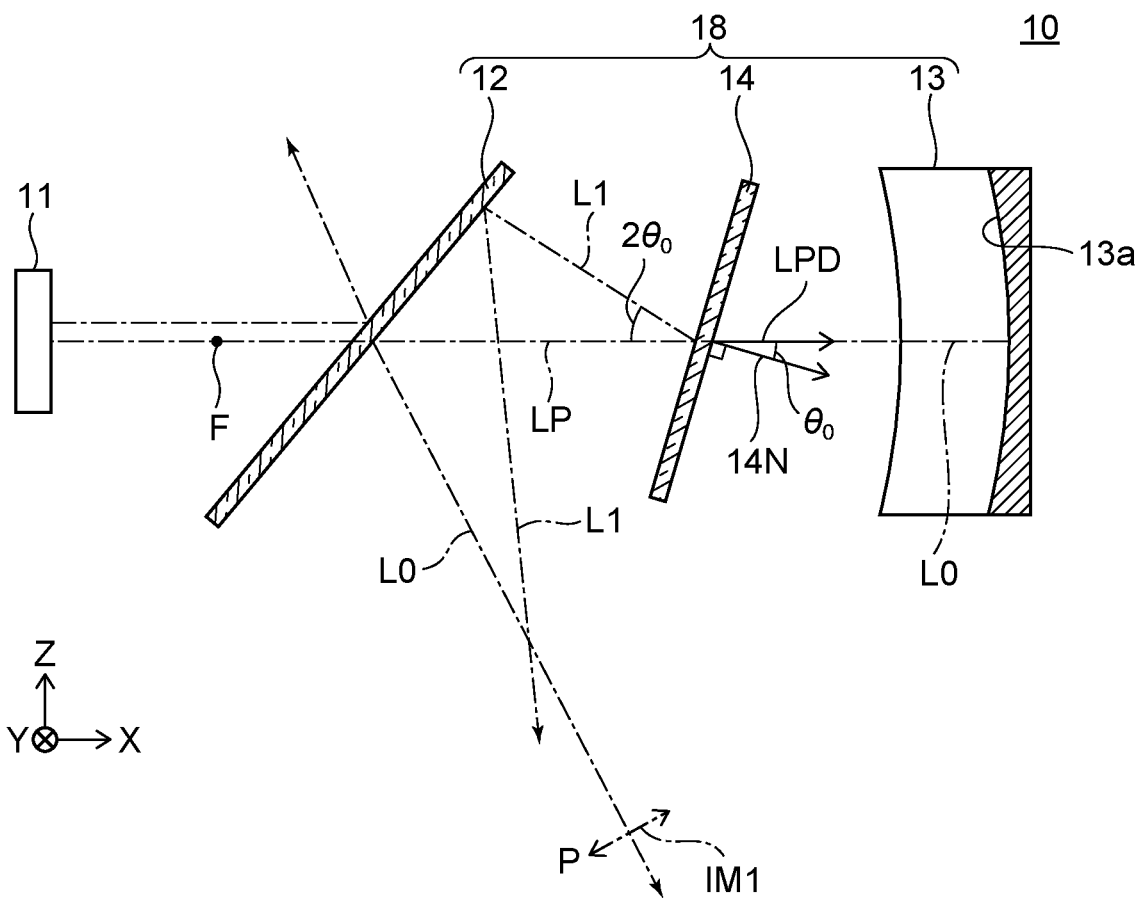
FIG. 2 is an end view showing a light source unit according to the first embodiment.

FIG. 2 is an end view showing a light source unit according to the embodiment.

As shown in FIG. 1, for example, the image display device 1 according to the embodiment is mounted in a vehicle 101 of an automobile 100, and is included in a HUD (Head Up Display). The automobile 100 includes the vehicle 101, and the image display device 1 mounted in the vehicle 101. A viewer 200 is a passenger of the automobile 100 and is, for example, the driver. An eyebox 201 of the viewer 200 refers to the area in the space in front of the eyes of the viewer 200 in which a virtual image described below is visible. The viewer 200 may wear polarized sunglasses 202.

The image display device 1 includes a light source unit 10 and a reflection unit 20. The reflection unit 20 is separated from the light source unit 10 and reflects a light L0 emitted from the light source unit 10. For example, the light source unit 10 is located above a ceiling board 102 inside the vehicle 101. The light L0 that is emitted from the light source unit 10 is incident on the reflection unit 20 via a hole 103 in the ceiling board 102. The reflection unit 20 is located in a part below a front windshield 104 of the vehicle 101 at, for example, the vicinity of a dashboard 105 and is exposed inside the vehicle 101.

The light source unit 10 includes a display device 11, a reflective polarizing element 12, a reflecting member 13, and a waveplate 14. The display device 11 is configured to display an image IM0. The display device 11 is, for example, an LED display that includes multiple LED (Light-Emitting Diode) elements. The light that is emitted from the display device 11 is incident on the reflective polarizing element 12, and the reflective polarizing element 12 transmits a first polarized light and reflects a second polarized light. For example, the first polarized light is P-polarized light, and the second polarized light is S-polarized light. However, the first polarized light may be S-polarized light, and the second polarized light may be P-polarized light. When the viewer 200 wears the polarized sunglasses 202, the direction of the polarized light transmitted by the reflective polarizing element 12 is set so that the polarized light is transmitted by the polarized sunglasses 202. The reflecting member 13 reflects the light (the first polarized light) transmitted by the reflective polarizing element 12 toward the reflective polarizing element 12.

For example, the direction of the polarized light may be defined using the incident plane of the light L0 incident on the front windshield 104 as a reference. The incident plane is a plane that is perpendicular to the inner surface (a reflecting surface 104a) of the front windshield 104 and includes an optical path LP of the light L0. Polarized light of which the electric field oscillates in the incident plane is called "P-polarized light," and polarized light of which the electric field oscillates perpendicular to the incident plane is called "S-polarized light." When the viewer 200 is assumed to wear the polarized sunglasses 202, the first polarized light transmitted by the reflective polarizing element 12 is P-polarized light because P-polarized light is more easily transmitted by the polarized sunglasses 202 than S-polarized light. A virtual image of P-polarized light can be displayed thereby. On the other hand, when it is desirable to ensure the luminance of the virtual image, the first polarized light is S-polarized light because S-polarized light is more easily reflected by the reflecting surface 104a of the front windshield 104 than P-polarized light. A virtual image of S-polarized light can be displayed thereby.

The waveplate 14 is interposed in a portion between the reflective polarizing element 12 and the reflecting member 13 of the optical path LP of the light L0 emitted from the display device 11, transmitted by the reflective polarizing element 12, reflected by the reflecting member 13, and reflected by the reflective polarizing element 12. The waveplate 14 is, for example, a λ/4-plate. The λ/4-plate provides a phase difference of π/2, i.e., λ/4, to the electric field oscillation direction of the incident light.

The light that is transmitted by the reflective polarizing element 12 passes through the waveplate 14 twice in the process of being reflected by the reflecting member 13 and being incident on the reflective polarizing element 12 again. A phase difference of λ/2 is thereby provided to the light L0, and the first polarized light is changed to the second polarized light. As a result, the light L0 is reflected by the reflective polarizing element 12. The light that travels along the optical path LP and is reflected by the reflective polarizing element 12 is emitted from the light source unit 10.

The reflection unit 20 reflects the light L0 emitted from the light source unit 10. The light L0 that is reflected by the reflection unit 20 is reflected by the reflecting surface 104a arranged to face the eyebox 201 of the viewer 200, and is incident on the eyebox 201. The reflecting surface 104a is, for example, the inner surface of the front windshield 104 of the automobile 100.

The light L0 that is emitted from the display device 11, transmitted the reflective polarizing element 12, reflected by the reflecting member 13 via the waveplate 14, and reflected by the reflective polarizing element 12 forms a first image IM1 corresponding to the image IM0 at a position P between the light source unit 10 and the reflection unit 20. The first image IM1 is a real image, and is an intermediate image. The conditions at which the first image IM1 is formed are described below.

The viewer 200 can view a second image IM2 corresponding to the image IM0 by the light L0 emitted from the light source unit 10, reflected by the reflection unit 20, and reflected by the reflecting surface 104a entering the eyebox 201 of the viewer 200. The second image IM2 is a virtual image. The viewer 200 views the second image IM2 beyond the front windshield 104.

As shown in FIG. 2, a normal 14N of the surface of the waveplate 14 at the reflecting member 13 side (that is, a line perpendicular to the surface of the waveplate at the reflecting member 13 side) is tilted with respect to a direction LPD of the optical path LP transmitted by the waveplate 14 partway from the reflective polarizing element 12 toward the reflecting member 13. Hereinbelow, the angle between the direction LPD and the normal 14N of the waveplate 14 is called the "angle $\theta_0$." The normal 14N of the waveplate 14 is tilted with respect to the direction LPD so that a light L1 emitted from the display device 11, transmitted by the reflective polarizing element 12, and reflected by the waveplate 14 does not enter the eyebox 201. Because the light L1 is the first polarized light, the greater part of the light L1 is transmitted by the reflective polarizing element 12 when the light L1 is incident on the reflective polarizing element 12, but a portion is reflected by the reflective polarizing element 12.

In other words, the image display device 1 according to the embodiment is configured so that the light L0 that travels along the optical path LP and is transmitted twice by the waveplate 14 enters the eyebox 201, but is configured so that the light L1 that is reflected by the waveplate 14 after being transmitted by the reflective polarizing element 12 and is not incident on the reflecting member 13 does not enter the eyebox 201.

As described in detail according to the second embodiment described below, it is favorable for the light L1 reflected by the waveplate 14 not to be incident on the reflective polarizing element 12 to begin with. However, it is sufficient that the light L1 is not incident on the reflection unit 20 if the light L1 is incident on the reflective polarizing element 12 and reflected by the reflective polarizing element 12. Also, it is sufficient that the light L1 is not incident on the reflecting surface 104*a* of the front windshield 104 if the light L1 is incident on the reflection unit 20. It is sufficient that the light L1 does not enter the eyebox 201 if the light L1 is incident on the reflecting surface 104*a* and reflected by the reflecting surface 104*a*. In other words, it is sufficient for the normal 14N of the waveplate 14 to be tilted with respect to the direction LPD enough that the light L1 does not enter the eyebox 201, favorable to be tilted enough that the light L1 is not incident on the reflecting surface 104*a*, more favorable to be tilted enough that the light L1 is not incident on the reflection unit 20, and even more favorable to be tilted enough that the light L1 is not incident on the reflective polarizing element 12.

Configurations of components of the image display device 1 will now be described in detail.

An XYZ orthogonal coordinate system is employed hereinbelow for easier understanding of the description. According to the embodiment, the longitudinal direction of the vehicle 101 is taken as an "X-direction," the lateral direction of the vehicle 101 is taken as a "Y-direction," and the vertical direction of the vehicle 101 is taken as a "Z-direction." The XY-plane is the horizontal plane of the vehicle 101. The direction of the arrow in the X-direction (front) also is called the "+X direction," and the opposite direction (back) also is called the "−X direction." The direction of the arrow in the Y-direction (left) also is called the "+Y direction," and the opposite direction (right) also is called the "−Y direction." The direction of the arrow in the Z-direction (up) also is called the "+Z direction," and the opposite direction (down) also is called the "−Z direction."

Display Device

Figure 3:
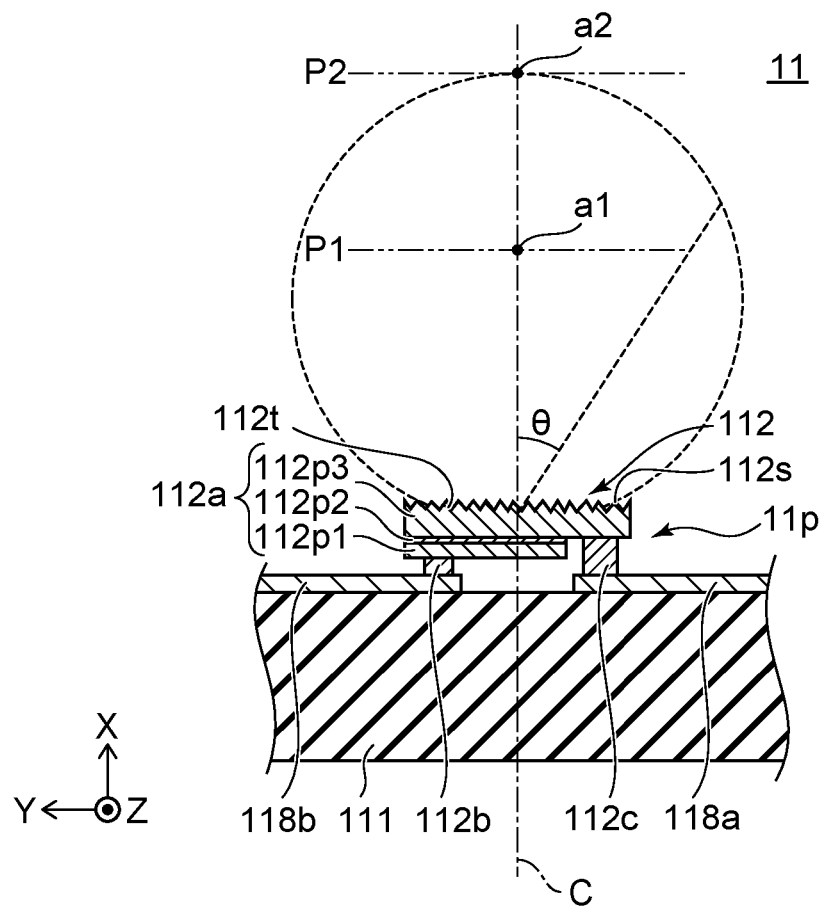
FIG. 3 is an end view showing a display device of the image display device according to the first embodiment.

FIG. 3 is an end view showing the display device of the image display device according to the embodiment.

As shown in FIG. 1, the display device 11 emits light substantially in the +X direction. The light forms the image IM0.

In the display device 11, multiple LED elements 112 such as that shown in FIG. 3 are arranged in a matrix configuration. One or multiple LED elements 112 correspond to each pixel 11*p* of the display device 11.

In the display device 11, each LED element 112 is mounted face-down on a substrate 111. However, each LED element may be mounted face-up on the substrate. Each LED element 112 includes a semiconductor stacked body 112*a*, an anode electrode 112*b*, and a cathode electrode 112*c*. The LED elements 112 of the display device 11 may be formed by direct crystal growth of a semiconductor stacked body on a circuit board including circuit elements.

The semiconductor stacked body 112*a* includes a p-type semiconductor layer 112*p*1, an active layer 112*p*2 located on the p-type semiconductor layer 112*p*1, and an n-type semiconductor layer 112*p*3 located on the active layer 112*p*2. The semiconductor stacked body 112*a* includes, for example, a gallium nitride compound semiconductor of $In_XAl_YGa_{1-X-Y}N$ ($0 \leq X$, $0 \leq Y$, and $X+Y<1$). According to the embodiment, the light that is emitted by the LED element 112 is visible light.

The anode electrode 112*b* is electrically connected to the p-type semiconductor layer 112*p*1. Also, the anode electrode 112*b* is electrically connected to a wiring part 118*b*. The cathode electrode 112*c* is electrically connected to the n-type semiconductor layer 112*p*3. Also, the cathode electrode 112*c* is electrically connected to another wiring part 118*a*. The electrodes 112*b* and 112*c* can include, for example, a metal material.

According to the embodiment, multiple recesses 112*t* are provided in a light-emitting surface 112*s* of each LED element 112. In the specification, "the light-emitting surface of the LED element" means the surface of the LED element that mainly emits light. According to the embodiment, the surface of the n-type semiconductor layer 112*p*3 that is positioned at the side opposite to the surface facing the active layer 112*p*2 corresponds to the light-emitting surface 112*s*.

Hereinbelow, the optical axis of the light emitted from each LED element 112 is called simply an "optical axis C." The optical axis C is, for example, a straight line that connects a point a1 in a first plane P1 and a point a2 in a second plane P2, wherein the first plane P1 is positioned at the light-emitting side of the display device 11 and parallel to the emission plane in which the multiple pixels 11*p* are arranged, the luminance is a maximum at the point a1 in the range in which the light is irradiated from one pixel 11*p*, the second plane P2 is parallel to the emission plane and separated from the first plane P1, and the luminance is a maximum at the point a2 in the range in which the light is irradiated from the LED element 112. For example, if the luminance has maxima at multiple points, the center of the points may be used as the maximum luminance point. From the perspective of productivity, it is desirable for the optical axis C to be orthogonal to the emission plane.

By providing the multiple recesses 112*t* in the light-emitting surface 112*s* of each LED element 112, the light that is emitted from each LED element 112, i.e., the light that is emitted from each pixel 11*p*, has a substantially Lambertian light distribution as shown by the broken line in FIG. 3. Therefore, the light that is emitted from the display device 11 has a substantially Lambertian light distribution. Herein, "the light emitted from each pixel has a substantially Lambertian light distribution" means that the luminous intensity in the direction of an angle θ with respect to the optical axis C of each pixel has a light distribution pattern that can be approximated by $\cos^n \theta$ times the luminous intensity at the optical axis C, wherein n is a value greater than 0. Here, it is favorable for n to be not more than 11, and more favorably 1. Although many planes including the optical axis C of the light emitted from one pixel 11*p* exist, the light distribution pattern of the light emitted from the pixel 11*p* has a substantially Lambertian light distribution in each plane, and the numerical values of n are substantially equal.

However, the configuration of each LED element is not limited to that described above. For example, multiple protrusions instead of multiple recesses may be provided in the light-emitting surface of each LED element, or both multiple recesses and multiple protrusions may be provided. When the growth substrate is light-transmissive, the growth substrate may not be detached from the semiconductor stacked body, and multiple recesses and/or multiple protrusions may be provided in the surface of the growth substrate corresponding to the light-emitting surface. In such configurations as well, the light that is emitted from each LED element has a substantially Lambertian light distribution. Also, in each LED element, an n-type semiconductor layer may be provided to face the substrate, an active layer and a p-type semiconductor layer may be stacked in this order on the n-type semiconductor layer, and the surface of the p-type semiconductor layer at the side opposite to the surface facing the active layer may be used as the light-emitting surface of the LED element.

Reflective Polarizing Element

Figure 4:
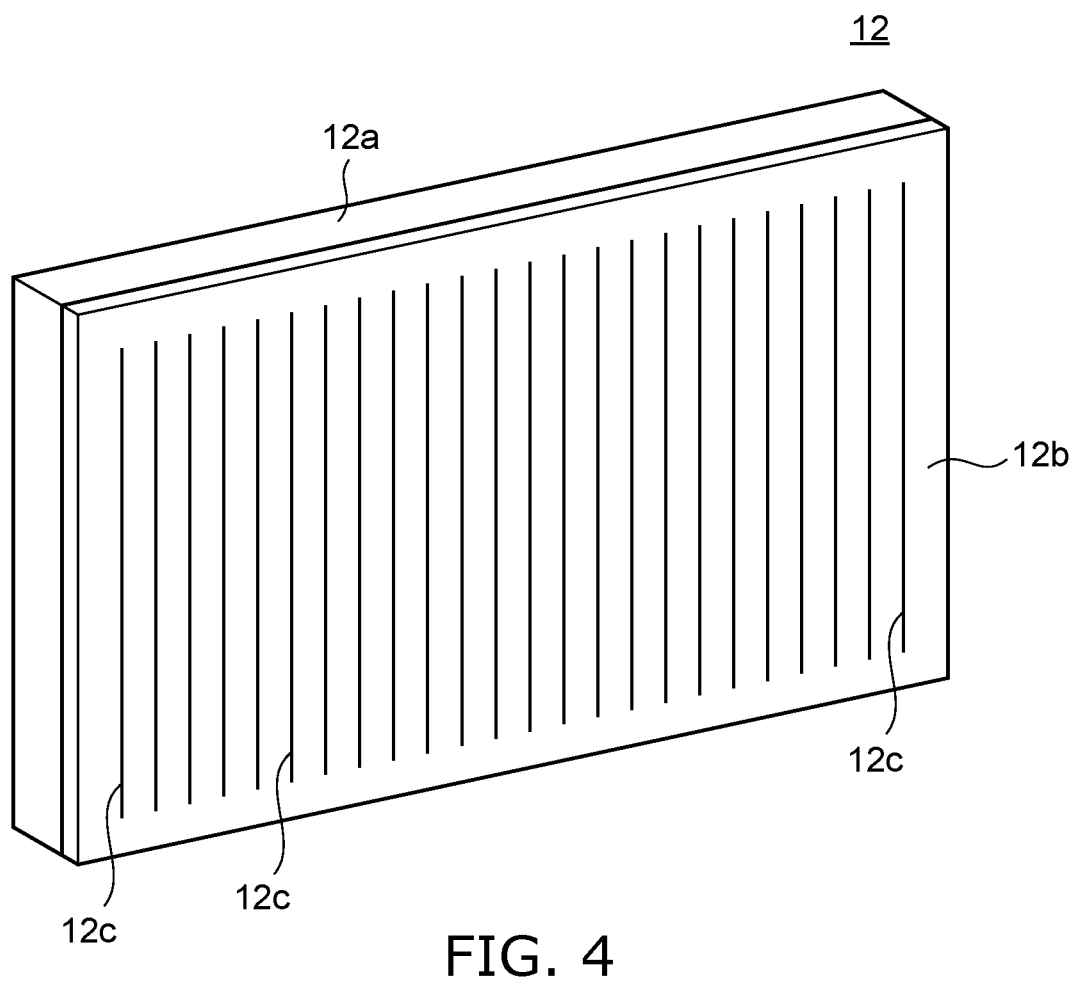
FIG. 4 is a perspective view showing a reflective polarizing element of the image display device according to the first embodiment.

FIG. 4 is a perspective view showing the reflective polarizing element of the image display device according to the embodiment.

As shown in FIGS. 1 and 2, the reflective polarizing element 12 is located at the +X direction side of the display device 11 at a position at which the light emitted from the display device 11 is incident on the reflective polarizing element 12. The reflective polarizing element 12 may have, for example, a flat plate shape or may have a curved plate shape. When the reflective polarizing element 12 has a flat plate shape, the surface of the reflective polarizing element 12 is a plane. When the reflective polarizing element 12 has a curved plate shape, the surface of the reflective polarizing element 12 is a curved surface. The surface of the reflective polarizing element 12 is parallel to the Y-direction. The reflective polarizing element 12 is tilted with respect to the YZ-plane with the Y-axis as the rotation center, and the surface that faces the display device 11 faces the +Z direction.

As shown in FIG. 4, the reflective polarizing element 12 is, for example, a wire grid polarizer. The reflective polarizing element 12 includes a transparent plate 12a, a transparent resin film 12b, and multiple metal wires 12c. In the reflective polarizing element 12, the transparent resin film 12b is located at the surface of the transparent plate 12a, and the multiple metal wires 12c are arranged at uniform spacing parallel to each other on the resin film 12b. Accordingly, the reflective polarizing element 12 transmits the first polarized light and reflects the second polarized light.

Reflecting Member

As shown in FIGS. 1 and 2, the reflecting member 13 is located at a position so that the light L0 transmitted by the reflective polarizing element 12 and the waveplate 14 is incident on the reflecting member 13. The reflecting member 13 includes a reflecting surface 13a that is concave toward the reflective polarizing element 12, and the light that is emitted from the reflective polarizing element 12, transmitted by the waveplate 14, and incident on the reflecting surface 13a is reflected by the reflecting surface 13a toward the reflective polarizing element 12. The light that is reflected by the reflecting member 13 is transmitted by the waveplate 14 and is incident on the reflective polarizing element 12.

The reflecting member 13 may include a main member made of glass, a resin material, or the like, and a reflective film such as a metal film, a dielectric multilayer film, or the like that includes the reflecting surface 13a and is located at the surface of the main member. The entire reflecting member 13 may include the metal material. In an example, the reflecting surface 13a is a biconic surface. However, the mirror surface may be a portion of a spherical surface or may be a freeform surface.

Imaging Optical System

According to the embodiment as shown in FIGS. 1 and 2, the display device 11, the reflective polarizing element 12, the waveplate 14, and the reflecting member 13 are arranged in this order along the +X direction. An imaging optical system 18 includes the reflective polarizing element 12, the reflecting member 13, and the waveplate 14. The light that is emitted from the display device 11 is incident on the imaging optical system 18, and the imaging optical system 18 forms the first image IM1 corresponding to the image IM0. The imaging optical system 18 is an optical system that includes all of the optical elements necessary to form the first image IM1 at the prescribed position. The imaging optical system 18 may include optical elements other than the reflective polarizing element 12, the reflecting member 13, and the waveplate 14.

The imaging optical system 18 is substantially telecentric at the first image IM1 side. Herein, "the imaging optical system 18 is substantially telecentric at the first image IM1 side" means that the multiple chief rays that are emitted from mutually-different positions of the display device 11, travel via the imaging optical system 18, and reach the first image IM1 are substantially parallel to each other before and after the first image IM1. "Different positions" refers to, for example, different pixels 11p. "The multiple chief rays being substantially parallel to each other" means being substantially parallel in a practical range that allows error such as the manufacturing precision, assembly accuracy, etc., of the components of the light source unit 10. When "the multiple chief rays are substantially parallel to each other," for example, the angle between the chief rays is not more than 10 degrees.

When the imaging optical system 18 is substantially telecentric at the first image IM1 side, the multiple chief rays cross each other before being incident on the reflective polarizing element 12. Hereinbelow, the point at which the multiple chief rays cross each other is called a "focal point F." Therefore, for example, whether or not the imaging optical system 18 is substantially telecentric at the first image IM1 side can be confirmed by utilizing the backward propagation of light in the following technique. First, a light source that can emit parallel light such as a laser light source or the like is disposed at the vicinity of the position at which the first image IM1 is formed. The light that is emitted from the light source is irradiated on the reflective polarizing element 12 of the imaging optical system 18. The light that is emitted from the light source and reflected by the reflective polarizing element 12 is incident on the reflective polarizing element 12 via the waveplate 14, the reflecting member 13, and the waveplate 14. Then, if the light that is emitted from the reflective polarizing element 12 condenses at a point, i.e., the focal point F, before reaching the display device 11, then the imaging optical system 18 can be determined to be substantially telecentric at the first image IM1 side.

Because the imaging optical system 18 is substantially telecentric at the first image IM1 side, the light from each pixel 11p that is mainly incident on the imaging optical system 18 is the light that passes through the focal point F and the vicinity of the focal point F. The configuration and position of the coupling optical system are not limited to those described above as long as the coupling optical system is substantially telecentric at the first image side.

Reflection Unit

According to the embodiment, the reflection unit 20 includes a mirror 21 having a mirror surface 21a that is concave toward the vehicle interior. According to the embodiment, the mirror surface 21a is a biconic surface. However, the mirror surface may be a portion of a spherical surface or may be a freeform surface. As shown in FIGS. 1 and 2, the mirror 21 is arranged to face the front windshield 104. The mirror 21 reflects the light emitted from the light source unit 10 and irradiates the light on the front windshield 104.

The mirror 21 may include a main member made of glass, a resin material, or the like, and a reflective film such as a metal film, a dielectric multilayer film, or the like forming the mirror surface 21a located at the surface of the main member. The entire mirror 21 may include a metal material.

Effects

According to the image display device 1 according to the embodiment, the viewer 200 can view the second image IM2 which is a virtual image. When viewed by the viewer 200, the second image IM2 is viewed as being frontward of the front windshield 104. Therefore, the viewer 200 can view the second image IM2 without removing the line of sight from the front of the automobile 100 and without greatly changing the eye focal length. When the viewer 200 is the driver of the automobile 100, the viewer 200 can safely view the second image IM2 even when driving. The second image IM2 corresponds to the image IM0 displayed by the display device 11. The second image IM2 is, for example, information of the state of the automobile 100, information of the conditions of the surroundings of the automobile 100, or navigation information.

According to the embodiment, the imaging optical system 18 can be reduced in size by the imaging optical system 18 being substantially telecentric at the first image IM1 side. The light source unit 10 can be reduces in size thereby. Also, the quality of the second image IM2 can be improved. This effect is described below.

There are cases where the viewer 200 wears the polarized sunglasses 202 to reduce glare such as sunlight reflected by a puddle in front of the vehicle 101 and transmitted by the front windshield 104, etc. In such a case as well, the viewer 200 can view the second image IM2 of sufficient intensity by setting the light L0 that is incident on the polarized sunglasses 202 to be polarized light that is easily transmitted by the polarized sunglasses 202.

Or, the visibility of the second image IM2 can be increased by increasing the luminance of the second image IM2 by setting the light L0 to be polarized light that is easily reflected by the reflecting surface 104a of the front windshield 104.

According to the image display device 1, the normal 14N of the waveplate 14 is tilted with respect to the direction LPD, thereby preventing the light L1 transmitted by the reflective polarizing element 12 and reflected by the waveplate 14 from entering the eyebox 201. The occurrence of ghosts caused by the light L1 can be suppressed thereby, and a high-quality image can be displayed. By tilting the waveplate 14, the light that is emitted from the display device 11, transmitted by the reflective polarizing element 12, transmitted by the waveplate 14, reflected by the reflecting member 13, subsequently reflected by the back surface of the waveplate 14, re-reflected by the reflecting member 13, and transmitted by the waveplate 14 can be prevented from entering the eyebox 201.

In contrast, if the normal 14N of the waveplate 14 is not tilted with respect to the direction LPD, that is, if the angle $\theta_0$ is 0 degrees, there is a possibility that the light L1 may travel along the same optical path LP as the light L0 and enter the eyebox 201. As a result, there is a possibility that the viewer 200 may view ghosts caused by the light L1. The quality of the second image IM2 degrades when the viewer 200 views ghosts. The safety when driving may be degraded by the viewer misrecognizing the image.

The effect of the imaging optical system 18 described above being substantially telecentric at the first image IM1 side, which enables the display of a high-quality small image, will now be described in detail.

Figure 5A:
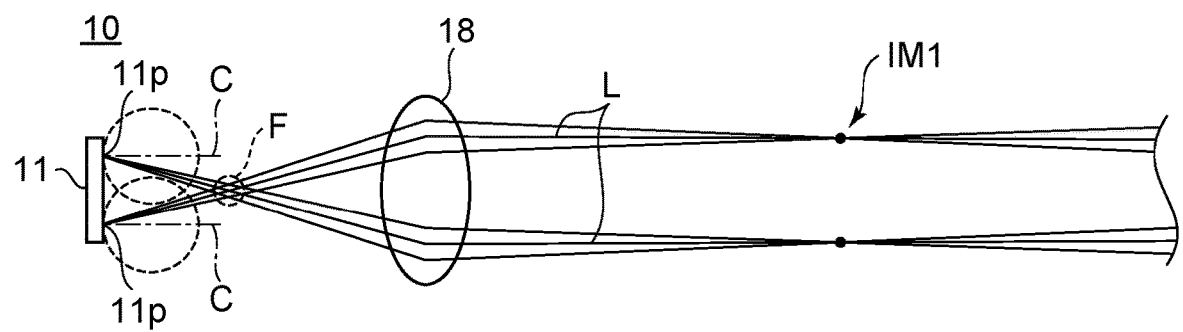
FIG. 5A is a schematic view showing a principle of the light source unit according to the first embodiment.

FIG. 5A is a schematic view showing the principle of a light source unit according to the embodiment.

Figure 5B:
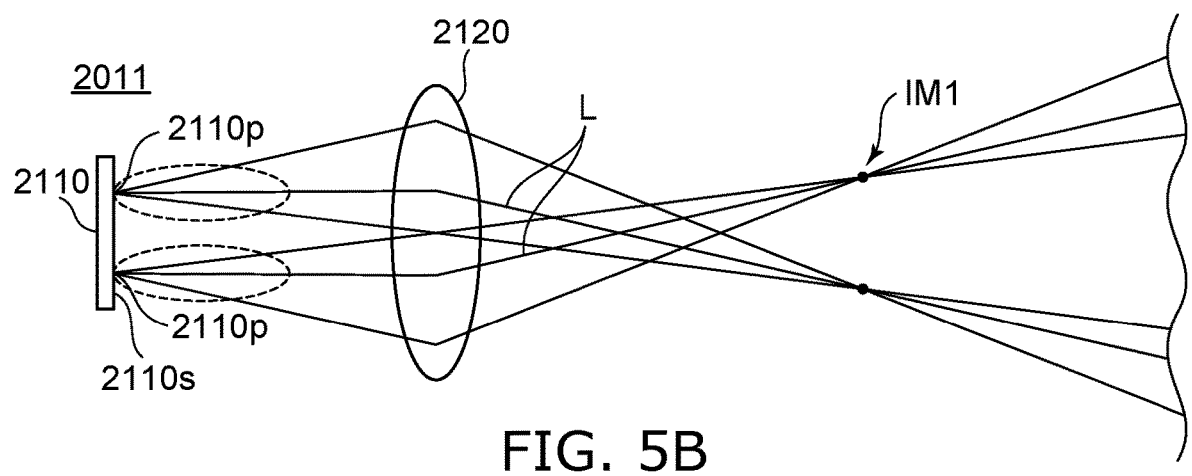
FIG. 5B is a schematic view showing a principle of a light source unit according to a reference example.

FIG. 5B is a schematic view showing the principle of a light source unit according to a reference example.

In the light source unit 2011 according to the reference example as shown in FIG. 5B, a display device 2110 is an LCD (Liquid Crystal Display) that includes multiple pixels 2110p. In FIG. 5A, the light distribution pattern of the light emitted from two pixels 11p among the multiple pixels 11p of the display device 11 according to the embodiment are illustrated by broken lines. Similarly, in FIG. 5B, the light distribution pattern of the light emitted from two pixels 2110p among the multiple pixels 2110p of the display device 2110 in the reference example are illustrated by broken lines. The imaging optical systems 18 and 2120 are not illustrated in FIGS. 5A and 5B.

In the display device 2110 in the reference example as shown in FIG. 5B, the light that is emitted from each pixel 2110p is mainly distributed in the normal direction of a light-emitting surface 2110s. Although many planes that include the optical axis of the light emitted from one pixel 2110p exist, in the display device 2110 which is an LCD, the light distribution patterns of the light emitted from one pixel 2110p are different from each other between the planes. In one plane among the multiple planes, the light that is emitted from the pixels 2110p has a light distribution pattern in which the luminous intensity in the direction of the angle $\theta$ with respect to the optical axis is approximated by $\cos^{20} \theta$ times the luminous intensity at the optical axis.

In such a display device 2110, the luminous intensity and/or chromaticity changes according to the viewing angle of the viewer, even when the light is emitted from the same position of the display device 2110. Accordingly, even when the luminance of the light emitted from all of the pixels is uniform, the luminance and/or chromaticity of the first image IM1 fluctuate if the imaging optical system 2120 receives the light emitted from the display device 2110 from directions other than the normal direction. In other words, the quality of the first image IM1 degrades. Accordingly, to prevent degradation of the quality of the first image IM1, it is necessary to receive the light emitted from each pixel 2110p of the display device 2110 from the normal direction. As a result, the imaging optical system 2120 is larger.

In contrast, in the light source unit 10 according to the embodiment, the imaging optical system 18 is substantially telecentric at the first image IM1 side, and the light emitted from the display device 11 has a substantially Lambertian light distribution. Therefore, the quality of the first image IM1 can be improved while downsizing the light source unit 10.

Specifically, because the light emitted from the display device 11 has a substantially Lambertian light distribution, the dependence on the angle of the luminous intensity and/or chromaticity of the light emitted from the pixels 11p of the display device 11 is less than the dependence on the angle of the luminous intensity and/or chromaticity of the light emitted from the pixels 2110p of the display device 2110 in the reference example. In particular, as an exact Lambertian light distribution is approached, that is, as the approximation formula of the light distribution pattern approaches $\cos^n \theta$ in which n is 1, the luminous intensity and/or chromaticity of the light emitted from each pixel 11p of the display device 11 is substantially uniform regardless of the angle. Therefore, as shown in FIG. 5A, even when the imaging optical system 18 receives light passing through the focal point F, that is, light from a direction other than the normal direction, the fluctuation of the luminance and/or chromaticity of the first image IM1 can be suppressed, and the quality of the first image IM1 can be improved.

Because the imaging optical system 18 forms the first image IM1 mainly with light passing through the focal point F, an increase of the light diameter of the light incident on the imaging optical system 18 can be suppressed. Furthermore, multiple chief rays L that are emitted from the light source unit 10 are substantially parallel to each other. The multiple chief rays L emitted from the light source unit 10 being substantially parallel to each other means that the range in which the light of the reflective polarizing element 12 of the light source unit 10 contributing to the image is irradiated is substantially equal to the size of the first image IM1. The reflective polarizing element 12 can be reduced in size thereby. Thus, the light source unit 10 can be provided in which a small and high-quality first image IM1 can be formed.

The first image IM1 is formed between the light source unit 10 and the reflection unit 20. In such a case, the light that is emitted from one point of the display device 11 is condensed at the formation position of the first image IM1 after traveling via the reflective polarizing element 12. On the other hand, when the first image IM1 is not formed between the light source unit 10 and the reflection unit 20, the light diameter of the light emitted from one point of the display device 11 gradually spreads from the light source unit 10 toward the reflection unit 20. Accordingly, in the reflective polarizing element 12 according to the embodiment, the range in which the light emitted from one point of the display device 11 is irradiated can be less than when the first image IM1 is not formed. Therefore, the reflective polarizing element 12 can be reduced in size, and even the light source unit 10 can be reduced in size.

Because the light source unit 10 according to the embodiment is small, the light source unit 10 can be easily arranged in the limited space inside the vehicle 101 when the light source unit 10 is mounted in the vehicle 101 and used as a head-up display.

Examples

Light source units according to examples will now be described.

Figure 6:
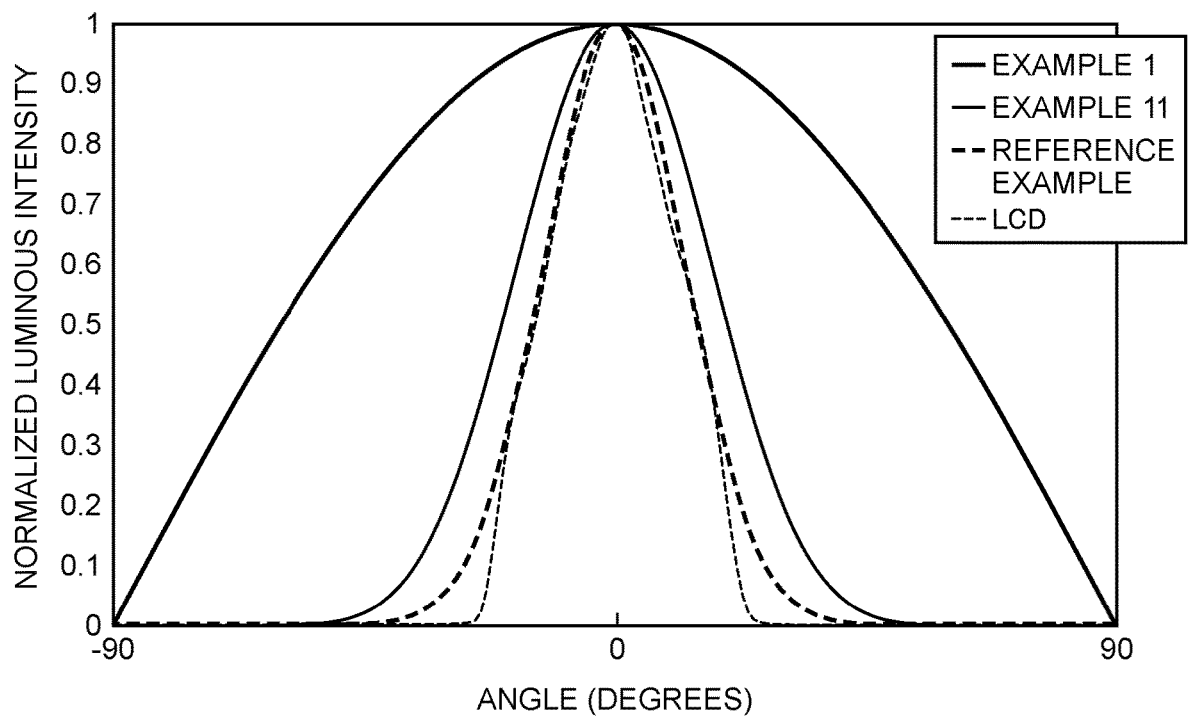
FIG. 6 is a graph showing light distribution patterns of lights emitted from one light-emitting area for examples 1 and 11, the reference example, and an LCD.

FIG. 6 is a graph showing a light distribution pattern of light emitted from one light-emitting area for examples 1 and 11, a reference example, and an LCD.

Figure 7:
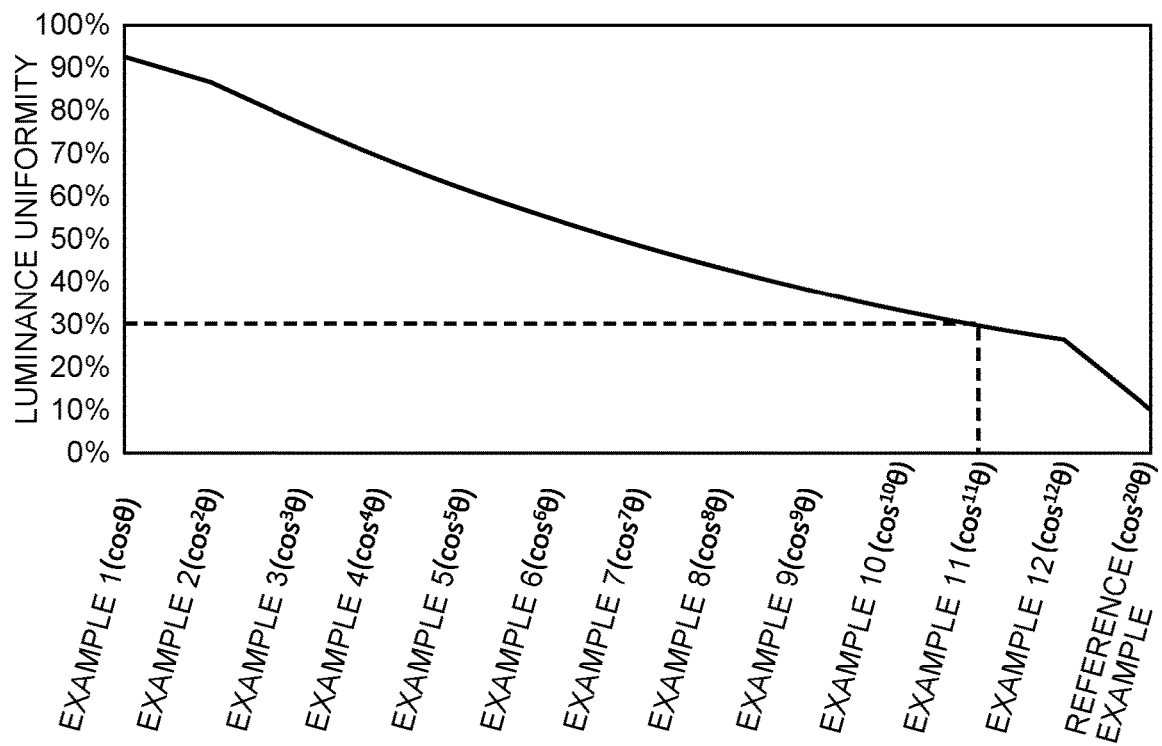
FIG. 7 is a graph showing uniformity of the luminance of a second image for the examples 1 to 12 and the reference example.

FIG. 7 is a graph showing the uniformity of the luminance of a second image for the examples 1 to 12 and the reference example.

The image display devices according to the examples 1 to 12 and the reference example were set in the simulation software to include a light source unit and a reflection unit, in which the light source unit included an imaging optical system and multiple light-emitting areas arranged in a matrix configuration. The light-emitting areas correspond to the pixels 11p of the display device 11 according to the first embodiment.

In FIG. 6, the horizontal axis is the angle with respect to the optical axis of the light-emitting area, and the vertical axis is the luminous intensity at the angle, normalized by dividing by the luminous intensity at the optical axis. As shown in FIG. 6, the display device according to the example 1 was set in the simulation software so that the light emitted from each light-emitting area had a light distribution pattern in which the luminous intensity in the direction of the angle θ with respect to the optical axis was represented by $\cos θ$ times the luminous intensity at the optical axis. In other words, according to the example 1, the light that was emitted from each light-emitting area had an exact Lambertian light distribution.

According to the examples 2 to 12, the light that was emitted from each light-emitting area was set in the simulation software to have a light distribution pattern in which the luminous intensity in the direction of the angle θ with respect to the optical axis was represented by $\cos^n θ$ times the luminous intensity at the optical axis. According to the example 2, n=2, and n was set to increase by one in order from the example 2 to the example 12.

By investigating the light distribution pattern in one plane of the light emitted from the pixels of an LCD, the light distribution pattern was found to be similar to that illustrated by the fine broken line in FIG. 6. As described above, it was found that the luminous intensity in the direction of the angle θ with respect to the optical axis in the light distribution pattern can be approximated by a light distribution pattern represented by $\cos^{20} θ$ times the luminous intensity at the optical axis. Therefore, in the reference example, the luminous intensity in the direction of the angle θ with respect to the optical axis of each light-emitting area was set in the simulation software to have the light distribution pattern represented by $\cos^{20} θ$ times the luminous intensity at the optical axis.

The imaging optical systems of the examples 1 to 12 and the reference example each were set to be telecentric at the first image side.

Then, the luminance distribution of the second image formed when the luminance was constant for all of the light-emitting areas was simulated for the examples 1 to 12 and the reference example. In this case, the second image was a rectangle having a long side of 111.2 mm and a short side of 27.8 mm. Also, in this case, the plane in which the second image was formed was divided into square areas having sides of 1 mm, and the luminance value of each area was simulated. Then, the uniformity of the luminance of the second image was evaluated. Herein, "the uniformity of the luminance" is the value of the ratio of the minimum value to the maximum value of the luminance inside the second image expressed in percent. The results are shown in FIG. 7. In FIG. 7, the horizontal axis is the examples and the reference example, and the vertical axis is the uniformity of the luminance.

As shown in FIG. 7, it was found that the uniformity of the luminance degraded as n increased. This is because the luminance at positions separated from the center of the second image decreased as n increased. In particular, it was found that the uniformity of the luminance was 30% for the example 11, that is, when n=11. It is considered that it is sufficient for the uniformity of the luminance of the second image to be not less than 30% so that the viewer can easily discriminate between the second image and the regions at which the second image is not formed.

Accordingly, it was found that when the imaging optical system is configured to be substantially telecentric, it is favorable for the light emitted from the display device to have a substantially Lambertian light distribution to suppress the uneven luminance of the first and second images. Specifically, it was found that it is favorable for n of $\cos^n θ$ which is the approximation formula of the light distribution pattern to be not more than 11, and more favorably 1. Although the uniformity of the luminance of the second image degrades as n exceeds 1 as described above, a prescribed luminance distribution can be preset in the display luminance of the display device 11 to remedy such nonuniformity of the luminance. For example, when the luminance at the outer edge portion of the second image tends to be less than the luminance at the central portion due to the light emitted from the pixels 11p of the display device 11 traveling via the imaging optical system 18, the display device 11 may control the outputs of the LED elements 112 of the pixels 11p at the outer edge vicinity of the display device 11 to be greater than the outputs of the LED elements 112 of the pixels 11p at the center.

Second Embodiment

Figure 8:
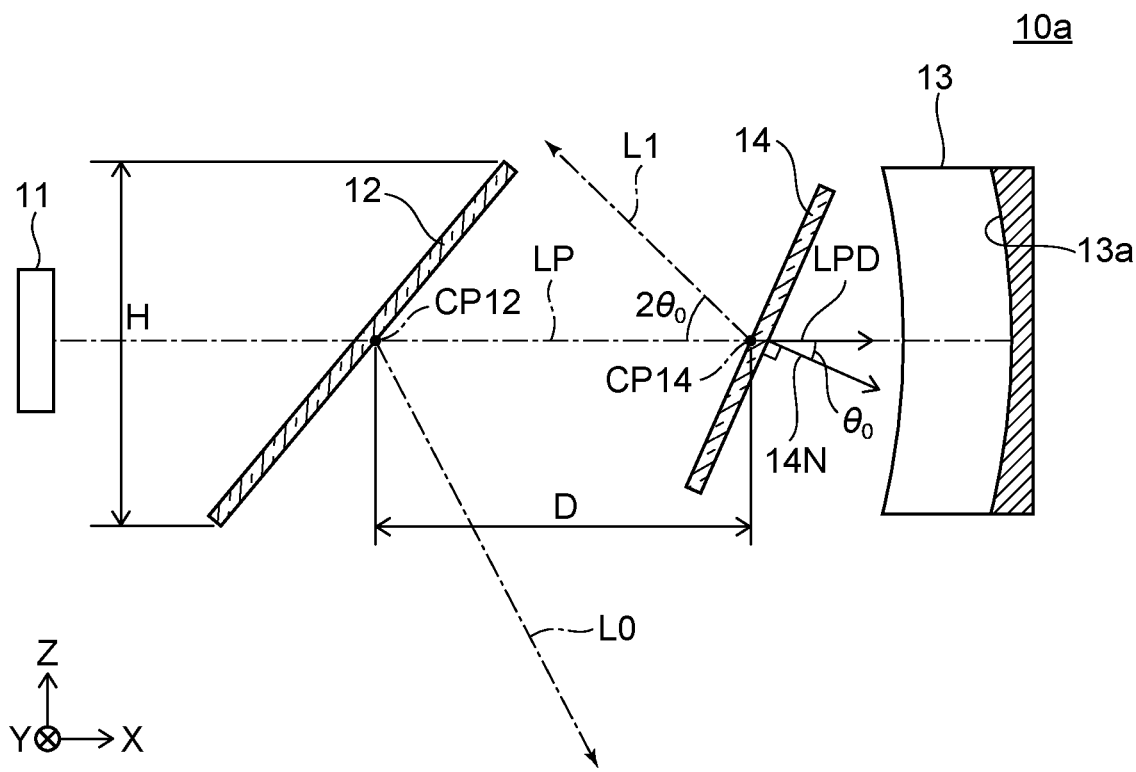
FIG. 8 is an end view showing a light source unit according to a second embodiment.

FIG. 8 is an end view showing a light source unit according to the embodiment.

Figure 9:
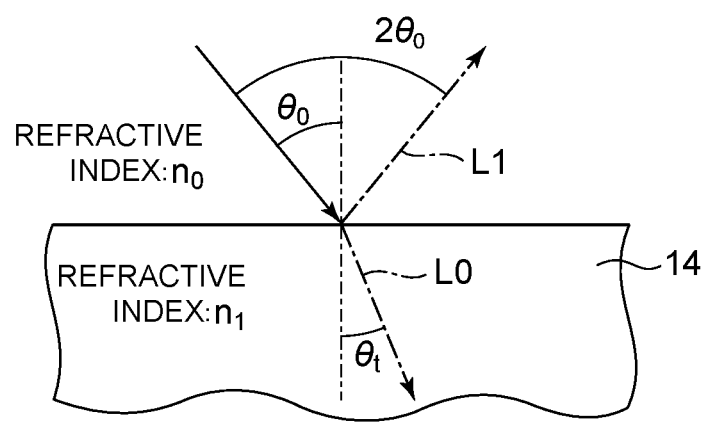
FIG. 9 is a schematic view showing when a light is incident on a waveplate according to the second embodiment.

FIG. 9 is a schematic view showing when the light is incident on the waveplate according to the embodiment.

In a light source unit 10a according to the embodiment as shown in FIG. 8, the normal 14N of the waveplate 14 is tilted with respect to the direction LPD so that the light L1 emitted from the display device 11, transmitted by the reflective polarizing element 12, and reflected by the waveplate 14 is not incident on the reflective polarizing element 12.

According to the embodiment, the reflective polarizing element 12 has a rectangular plate shape. In the example shown in FIG. 8, the direction in which the short side of the reflective polarizing element 12 extends is a direction orthogonal to the Y-direction, and the direction in which the long side of the reflective polarizing element 12 extends is the Y-direction. Then, the normal 14N of the waveplate 14 is tilted with respect to the direction LPD in a plane including the short side of the reflective polarizing element 12. In the example shown in FIG. 8, the normal 14N is tilted with respect to the direction LPD toward the −Z direction side with the Y-direction as the rotation axis. However, the normal 14N may be tilted with respect to the direction LPD toward the +Z direction side. When the short side of the reflective polarizing element 12 extends in the Y-direction, the normal 14N may be tilted with respect to the direction LPD in the +Y direction or the −Y direction with the Z-direction as the rotation axis.

As described above, the normal 14N is the normal of the surface of the waveplate 14 at the reflecting member 13 side. The direction LPD is the direction of the optical path LP of the light L0 transmitted by the waveplate 14 partway from the reflective polarizing element 12 toward the reflecting member 13. The light L0 is emitted from the display device 11, transmitted by the reflective polarizing element 12, transmitted by the waveplate 14, reflected by the reflecting member 13, re-transmitted by the waveplate 14, reflected by the reflective polarizing element 12, reflected by the reflection unit 20, and reflected by the reflecting surface 104a of the front windshield 104 to reach the eyebox 201 of the viewer 200.

The angle $\theta_0$ at which the light L1 is not incident on the reflective polarizing element 12 is defined by the following Formula (1), wherein $\theta_0$ is the angle between the direction LPD and the normal 14N of the waveplate 14, H is the length of the short side of the reflective polarizing element 12 in a direction orthogonal to the direction LPD, and D is the distance between an intersection CP12 between the reflective polarizing element 12 and the optical path LP and an intersection CP14 between the waveplate 14 and the optical path LP. However, the optical path LP is assumed to pass through the center of the reflective polarizing element 12.

[Formula 1]

$$\theta_0 \geq 0.5 \times a \tan(H/2D) \tag{1}$$

Formula (1) above can be calculated as follows.

From FIG. 8, the angle between the direction of the portion of the optical path LP from the waveplate 14 toward the reflective polarizing element 12 and the direction of the light reflected by the waveplate 14 is $2\theta_0$. Therefore, the following Formula (2) holds.

[Formula 2]

$$\tan(2v_0) \geq (H/2)/D \tag{2}$$

From Formula (2) above, the following Formula (3) holds and therefore Formula (1) above holds. Formula (1) above defines the lower limit of the angle $\theta_0$ according to the embodiment.

[Formula 3]

$$a \tan(H/2D) \leq 2\theta_0 \tag{3}$$

On the other hand, the upper limit of the angle $\theta_0$ may be defined as follows.

The following Formulas (4) and (5) hold, wherein Irp is the surface reflectance of the waveplate 14 for P-polarized light, Irs is the surface reflectance of the waveplate 14 for S-polarized light, and as shown in FIG. 9, $n_0$ is the refractive index outside the waveplate 14, $n_1$ is the refractive index inside the waveplate 14, $\theta_0$ is the incident angle of the light on the waveplate 14, and $\theta_0$ is the refraction angle after being incident on the waveplate 14.

[Formula 4]

$$Irp = \left( \frac{n_0 \times \cos\theta t - n_1 \times \cos\theta_0}{n_0 \times \cos\theta t + n_1 \times \cos\theta_0} \right) \tag{4}$$

[Formula 5]

$$Irs = \left( \frac{n_0 \times \cos\theta_0 - n_1 \times \cos\theta t}{n_0 \times \cos\theta_0 + n_1 \times \cos\theta t} \right) \tag{5}$$

To display a bright high-quality image, it is favorable for the surface reflectances Irp and Irs each to be not more than 20%. Therefore, in Formulas (4) and (5) described above, it is favorable to set the angle $\theta_0$ so that the surface reflectances Irp and Irs each are not more than 0.2.

In a specific example in which ambient air is outside the waveplate 14, the refractive index $n_0$=1.0. When the material of the waveplate 14 is a polymethyl methacrylate (PMMA) resin, the refractive index $n_1$ equals 1.4936. When these values are substituted in Formulas (4) and (5) described above, the angle $\theta_0$ at which the surface reflectance Irp of P-polarized light is not more than 0.2 is not more than 78.9 degrees, and the angle $\theta_0$ at which the surface reflectance Irs of S-polarized light is not more than 0.2 is not more than 62.7 degrees.

As the angle $\theta_0$ is increased, it becomes necessary to make the waveplate 14 larger to ensure the incident region of the light L0. Therefore, to reduce the size and cost of the image display device, it is favorable to set the angle $\theta_0$ to be as small as possible within the range in which the quality of the image can be guaranteed. In an example, the angle $\theta_0$ may be set to be not less than 3 degrees and not more than 20 degrees.

According to the embodiment, the light L1 that is reflected by the waveplate 14 is not incident on the reflective polarizing element 12, therefore, the light L1 can reliably avoid entering the eyebox 201, and the occurrence of ghosts can be reliably prevented. Also, the light L1 can be prevented from becoming stray light that is reflected by the reflective polarizing element 12 to penetrate the vehicle interior of the automobile 100. Otherwise, the configuration, operations, and effects according to the embodiment are similar to those of the first embodiment.

Third Embodiment

Figure 10:
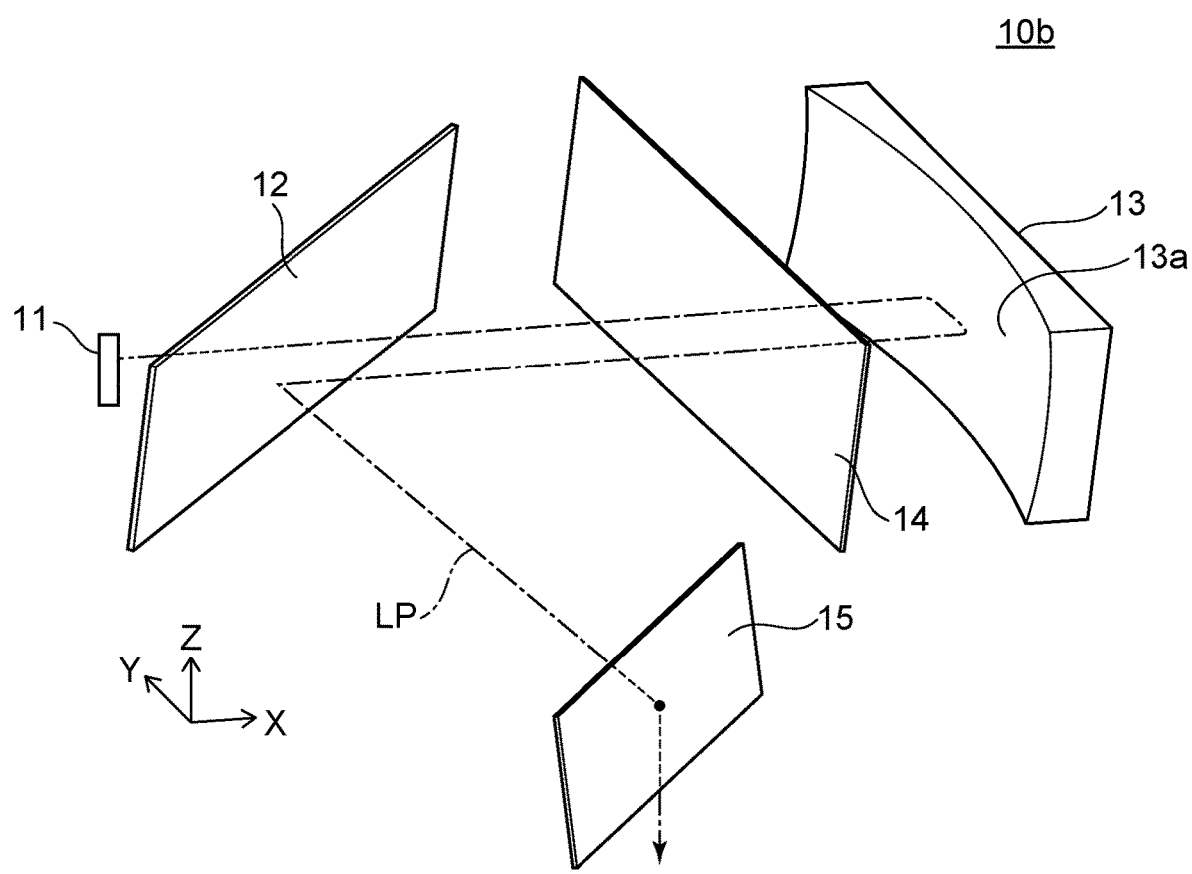
FIG. 10 is a perspective view showing a light source unit according to a third embodiment.

FIG. 10 is a perspective view showing a light source unit according to the embodiment.

Figure 11:
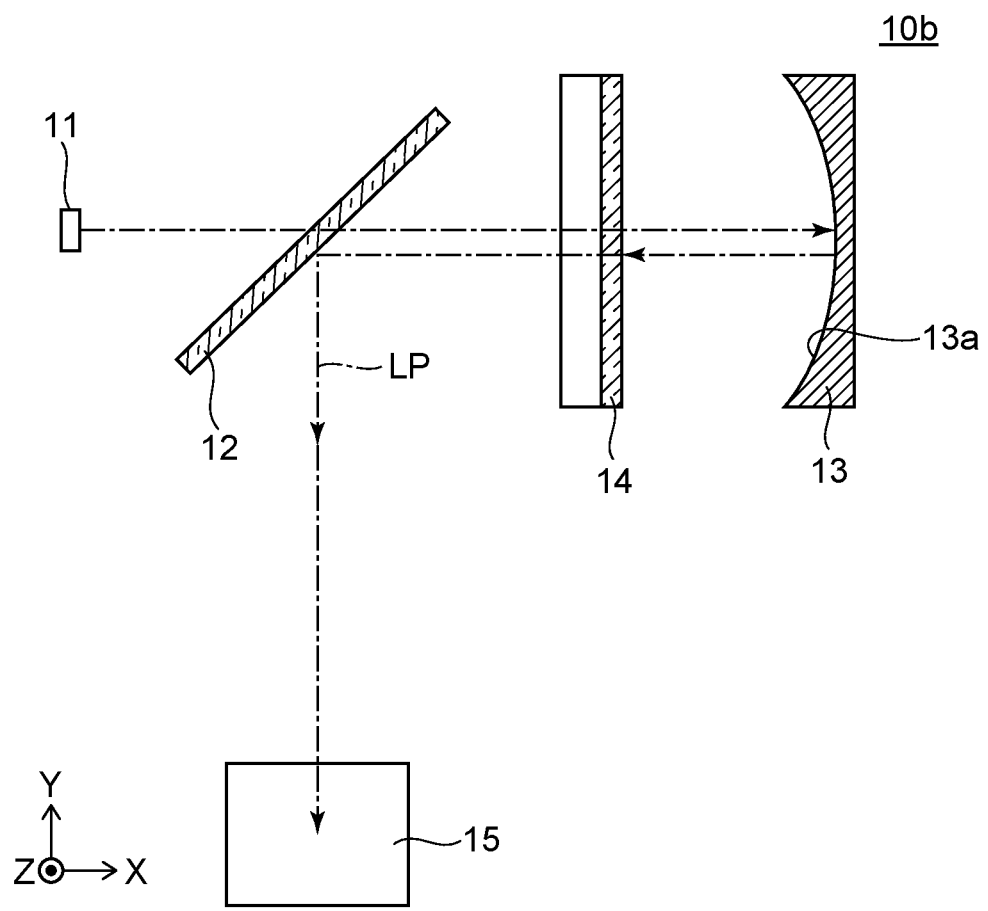
FIG. 11 is a top view showing the light source unit according to the third embodiment.

FIG. 11 is a top view showing the light source unit according to the embodiment.

Figure 12:
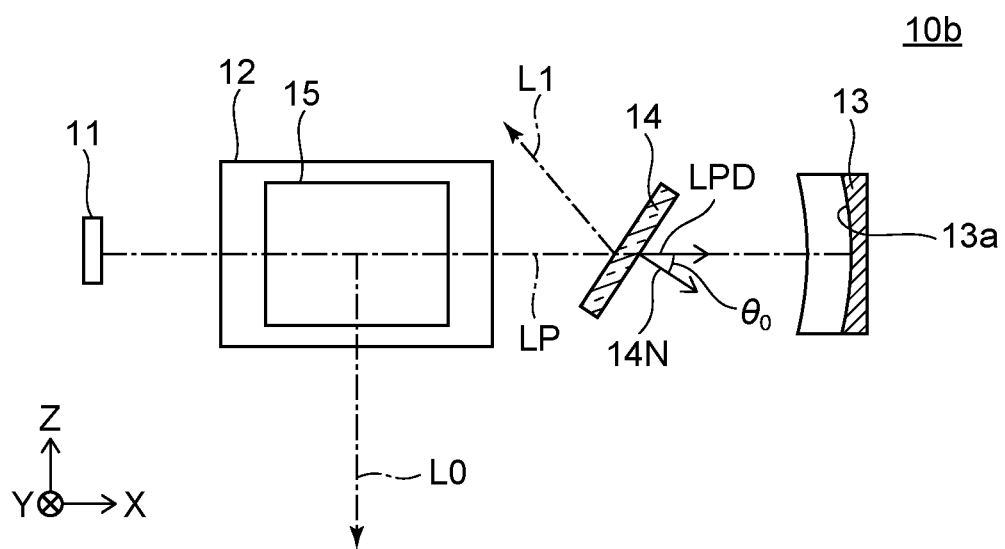
FIG. 12 is a side view showing the light source unit according to the third embodiment.

FIG. 12 is a side view showing the light source unit according to the embodiment.

Although the path of the light incident on the reflecting member 13 and the path of the light reflected by the reflecting member 13 are illustrated as being shifted from each other for easier viewing of the drawings in FIGS. 10 and 11, these paths contact the reflecting surface 13a at the same point and are substantially aligned with each other. This is similar for FIG. 13 below.

As shown in FIGS. 10 to 12, the optical path LP is set three-dimensionally in the light source unit 10b according to the embodiment. The light source unit 10b includes a reflecting member 15.

The display device 11 emits light in the +X direction. The reflective polarizing element 12 is located at the +X direction side of the display device 11 so that the light emitted from the display device 11 is incident on the reflective polarizing element 12. The reflective polarizing element 12 is tilted with respect to the YZ-plane with the Z-axis as a rotation axis so that the surface at the display device 11 side faces the +Y direction.

The waveplate 14 is located at the +X direction side of the reflective polarizing element 12 so that the light transmitted by the reflective polarizing element 12 is incident on the waveplate 14. The reflecting member 13 is located at the +X direction side of the waveplate 14 so that the light transmitted by the waveplate 14 is incident on the reflecting member 13. As a result, the reflecting member 13 reflects the incident light from the waveplate 14 toward the waveplate 14.

Similarly to the first embodiment, the normal 14N of the waveplate 14 is tilted with respect to the direction LPD of the optical path LP transmitted by the waveplate 14. For example, the waveplate 14 is tilted with the Y-axis as a rotation axis so that the surface at the −X direction side faces the +Z direction. As a result, the light L1 that is emitted from the reflective polarizing element 12 and reflected by the waveplate 14 can be prevented from entering the eyebox 201.

The reflecting member 15 is located at the −Y direction side of the reflective polarizing element 12 so that the light emitted from the waveplate 14 and reflected by the reflective polarizing element 12 is incident on the reflecting member 15. The reflecting member 15 is, for example, a plate-shaped member. A light-reflecting surface 15a of the reflecting member 15 is tilted with respect to the XY-plane with the X-axis as a rotation axis. As a result, the reflecting member 15 reflects the light incident from the reflective polarizing element 12 in the −Z direction. The light that is reflected by the reflecting member 15 is emitted from the light source unit 10 to be incident on the reflection unit 20.

According to the embodiment, the X-direction length of the light source unit 10b can be reduced because a portion of the optical path LP is set along the Y-direction. Otherwise, the configuration, operations, and effects according to the embodiment are similar to those of the first embodiment.

Fourth Embodiment

Figure 13:
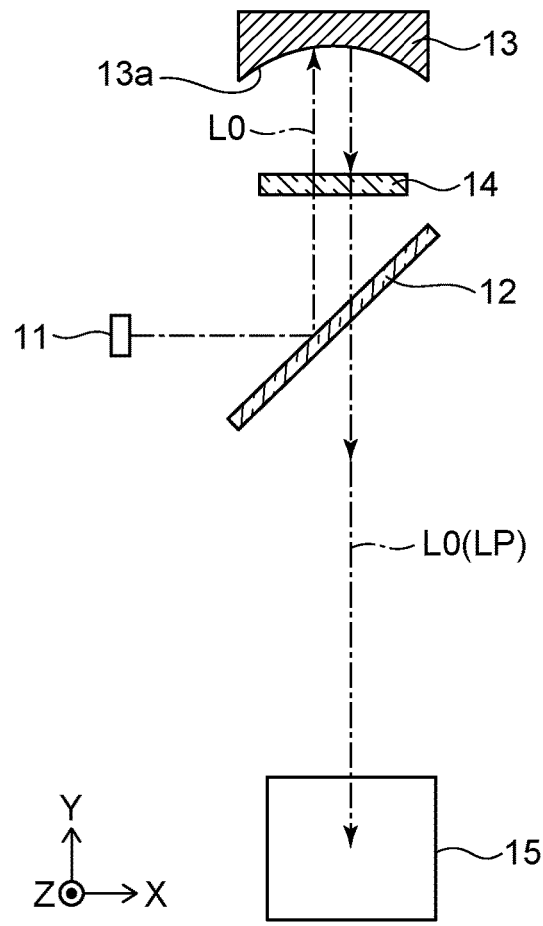
FIG. 13 is a top view showing a light source unit according to a fourth embodiment.

FIG. 13 is a top view showing a light source unit according to the embodiment.

Figure 14:
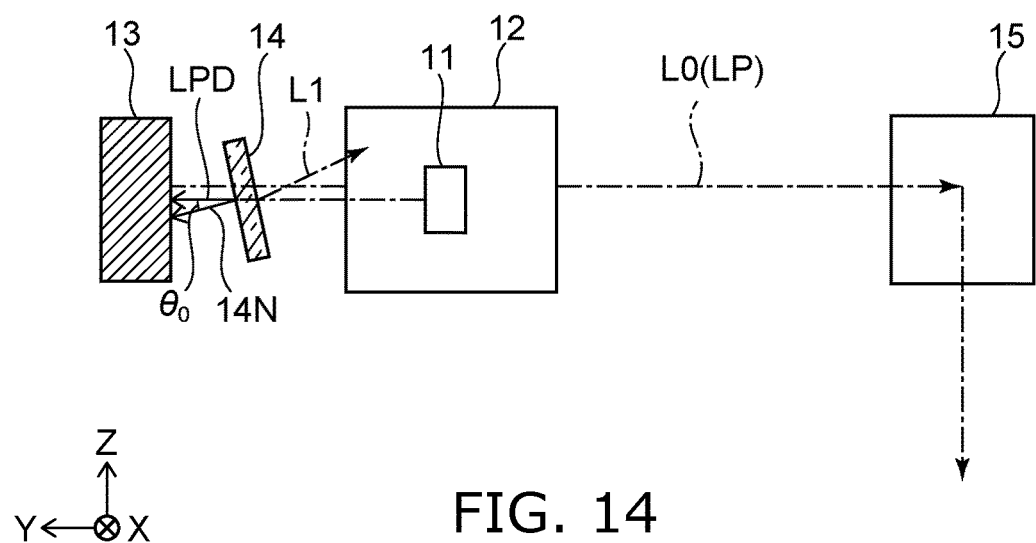
FIG. 14 is a back view showing the light source unit according to the fourth embodiment.

FIG. 14 is a back view showing the light source unit according to the embodiment.

Figure 15:
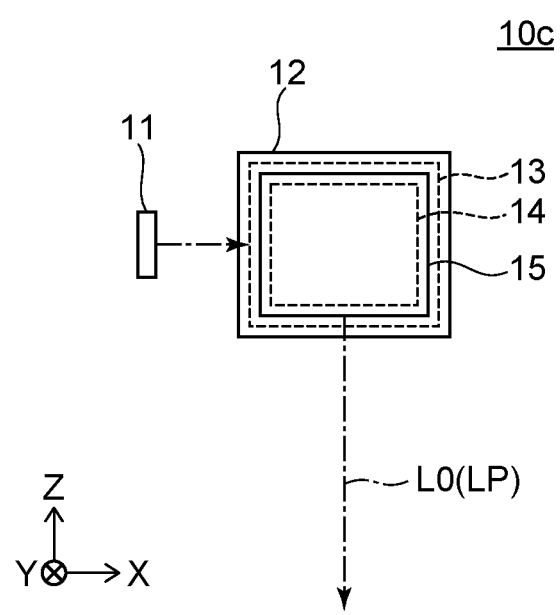
FIG. 15 is a side view showing the light source unit according to the fourth embodiment.

FIG. 15 is a side view showing the light source unit according to the embodiment.

As shown in FIGS. 13 to 15, the function of the reflective polarizing element 12 on the optical path LP in the light source unit 10c according to the embodiment is different from that of the light source unit 10b according to the third embodiment. In the light source unit 10b according to the third embodiment, the light that is emitted from the display device 11 and transmitted by the reflective polarizing element 12 as polarized light is incident on the waveplate 14; however, in the light source unit 10c according to the embodiment, the light that is emitted from the display device 11 and reflected by the reflective polarizing element 12 as polarized light is incident on the waveplate 14.

A more detailed description follows.

The light source unit 10c according to the embodiment includes the display device 11, the reflective polarizing element 12, the reflecting member 13, and the waveplate 14. The display device 11 is configured to display the image IM0. The light that is emitted from the display device 11 is incident on the reflective polarizing element 12, and the reflective polarizing element 12 reflects the first polarized light and transmits the second polarized light. The first polarized light is, for example, P-polarized light, and the second polarized light is, for example, S-polarized light. The first polarized light may be S-polarized light, and the second polarized light may be P-polarized light.

The reflecting member 13 reflects the light (the first polarized light) reflected by the reflective polarizing element 12 toward the reflective polarizing element 12. The waveplate 14 is interposed between the reflective polarizing element 12 and the reflecting member 13 in a portion of the optical path LP of the light L0 emitted from the display device 11, reflected by the reflective polarizing element 12, reflected by the reflecting member 13, and transmitted by the reflective polarizing element 12. The normal 14N of the waveplate 14 is tilted with respect to the direction LPD of the optical path LP transmitted by the waveplate 14 partway from the reflective polarizing element 12 toward the reflecting member 13.

The display device 11 is an LED display including multiple LED elements. The light that is emitted from the LED elements has a substantially Lambertian light distribution. As a result, the light that is emitted from the display device 11 has a substantially Lambertian light distribution. As shown in FIGS. 5A, 6, and 7, the light that is emitted from the display device 11 has a light distribution pattern in which the luminous intensity in the direction of the angle $\theta_0$ with respect to the optical axis C of the light emitted from the display device is approximated by $\cos^n \theta$ times the luminous intensity at the optical axis C. n is a value greater than 0 and is, for example, a value not more than 11. It is favorable for the value of n to be small, and more favorably 1. The display device 11 mainly emits light in the +X direction.

The reflective polarizing element 12 located at the +X direction side of the display device 11 so that the light emitted from the display device 11 is incident on the reflective polarizing element 12. The reflective polarizing element 12 is, for example, the wire grid polarizer shown in FIG. 4. The reflective polarizing element 12 is tilted with respect to the YZ-plane with the Z-axis as a rotation axis. The reflective polarizing element 12 is tilted so that the surface at the display device 11 side faces the +Y direction.

The reflecting member 13 is located at the +Y direction side of the reflective polarizing element 12 so that the light emitted from the display device 11 and reflected by the reflective polarizing element 12 is incident on the reflecting member 13. The reflecting surface 13a of the reflecting member 13 is concave.

The waveplate 14 is, for example, a λ/4-plate. As a result, the light that is emitted from the display device 11 and reflected by the reflective polarizing element 12 is transmitted by the waveplate 14 twice between being reflected by the reflecting member 13 and being incident on the reflective polarizing element 12. As a result, the light that is reflected by the reflective polarizing element 12 is changed from the first polarized light to the second polarized light and is transmitted by the reflective polarizing element 12.

The light L0 that is emitted from the display device 11, reflected by the reflective polarizing element 12, reflected by the reflecting member 13, and transmitted by the reflective polarizing element 12 forms the first image IM1 corresponding to the image IM0. The first image IM1 is a real image, and is an intermediate image. The imaging optical system 18 that includes the reflective polarizing element 12, the reflecting member 13, and the waveplate 14 is substantially telecentric at the first image IM1 side.

The image display device according to the embodiment includes the light source unit 10c, and the reflection unit 20 reflecting the light emitted from the light source unit 10c. The first image IM1 is formed between the light source unit 10c and the reflection unit 20. Parts of the image display device according to the embodiment other than the light source unit 10c are similar to the parts other than the light source unit 10 in FIG. 1. The light source unit 10c may include the reflecting member 15. The light that is transmitted by the reflective polarizing element 12 is incident on the reflecting member 15, and the reflecting member 15 reflects the light toward the reflection unit 20. The reflecting member 15 is located at the −Y direction side of the reflective polarizing element 12 so that the light L0 reflected by the reflecting member 13 and transmitted by the reflective polarizing element 12 is incident on the reflecting member 15. For example, the reflecting member 15, the reflective polarizing element 12, the waveplate 14, and the reflecting member 13 are arranged in this order along the +Y direction. The display device 11 is located at the −X direction side of the reflective polarizing element 12.

As shown in FIG. 1, the light L0 that is incident from the light source unit 10c and reflected by the reflection unit 20 is reflected by the reflecting surface 104a arranged to face the eyebox 201 of the viewer 200 and enters the eyebox 201. The reflecting surface 104a is, for example, the inner surface of the front windshield 104 of the automobile 100. Even when the viewer 200 wears the polarized sunglasses 202, the polarization direction of the light L0 is set so that the light L0 is transmitted by the polarized sunglasses 202. As a result, the viewer 200 can view the second image IM2 corresponding to the image IM0. The second image IM2 is a virtual image.

According to the embodiment as well, similarly to the first embodiment, the normal 14N of the waveplate 14 is tilted with respect to the direction LPD so that the light L1 emitted from the display device 11, reflected by the reflective polarizing element 12, and reflected by the waveplate 14 does not enter the eyebox 201. Similarly to the second embodiment, it is favorable for the normal 14N of the waveplate 14 to be tilted with respect to the direction LPD so that the light L1 is not incident on the reflective polarizing element 12. It is favorable to define the lower limit of the angle $\theta_0$ between the normal 14N and the direction LPD using Formula (1) above. It is favorable to define the upper limit of the angle $\theta_0$ using Formulas (4) and (5) described above. According to the embodiment as well, effects similar to those of the first embodiment can be obtained. Otherwise, the configuration, operations, and effects according to the embodiment are similar to those of the third embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments herein may be made without departing from the spirit of the inventions. The embodiments described above can be implemented in combination with each other.

Embodiments include the following aspects.

Note 1

A light source unit, comprising:
a display device configured to display an image;
a reflective polarizing element on which light emitted from the display device is incident, the reflective polarizing element transmitting a first polarized light and reflecting a second polarized light;
a reflecting member reflecting, toward the reflective polarizing element, light transmitted by the reflective polarizing element; and
a waveplate interposed in a portion of an optical path between the reflective polarizing element and the reflecting member,
the optical path being of light emitted from the display device, transmitted by the reflective polarizing element, reflected by the reflecting member, and reflected by the reflective polarizing element,
a normal of the waveplate being tilted with respect to a direction of the optical path transmitted by the waveplate partway from the reflective polarizing element toward the reflecting member.

Note 2

The light source unit according to note 1, wherein
the light emitted from the display device, transmitted by the reflective polarizing element, reflected by the reflecting member, and reflected by the reflective polarizing element forms a first image corresponding to the image,
an imaging optical system that includes the reflective polarizing element, the reflecting member, and the waveplate is substantially telecentric at the first image side, and the light emitted from the display device has a substantially Lambertian light distribution.

Note 3

The light source unit according to note 1 or 2, wherein
the normal of the waveplate is tilted with respect to the direction of the optical path so that the light emitted from the display device, transmitted by the reflective polarizing element, and reflected by the waveplate is not incident on the reflective polarizing element.

Note 4

A light source unit, comprising:
a display device configured to display an image;
a reflective polarizing element on which light emitted from the display device is incident, the reflective polarizing element reflecting a first polarized light and transmitting a second polarized light;
a reflecting member reflecting, toward the reflective polarizing element, light reflected by the reflective polarizing element; and
a waveplate interposed in a portion of an optical path between the reflective polarizing element and the reflecting member,
the optical path being of light emitted from the display device, reflected by the reflective polarizing element, reflected by the reflecting member, and transmitted by the reflective polarizing element,
a normal of the waveplate being tilted with respect to a direction of the optical path transmitted by the waveplate partway from the reflective polarizing element toward the reflecting member.

Note 5

The light source unit according to note 4, wherein
the light emitted from the display device, reflected by the reflective polarizing element, reflected by the reflecting member, and transmitted by the reflective polarizing element forms a first image corresponding to the image,
an imaging optical system that includes the reflective polarizing element, the reflecting member, and the waveplate is substantially telecentric at the first image side, and
the light emitted from the display device has a substantially Lambertian light distribution.

Note 6

The light source unit according to note 4 or 5, wherein
the normal of the waveplate is tilted with respect to the direction of the optical path so that light emitted from the display device, reflected by the reflective polarizing element, and reflected by the waveplate is not incident on the reflective polarizing element.

Note 7

The light source unit according to note 2 or 5, wherein
the light emitted from the display device has a light distribution pattern in which a luminous intensity of the light emitted from the display device in a direction of an angle $\theta$ with respect to an optical axis of the light emitted from the display device is approximated by $\cos^n \theta$ times a luminous intensity at the optical axis, and n is a value greater than 0.

Note 8

The light source unit according to note 7, wherein
n is not more than 11.

Note 9

The light source unit according to any one of notes 1-8, wherein
the display device is an LED display including a plurality of LED elements.

Note 10

The light source unit according to note 9, wherein
light emitted from the LED element has a substantially Lambertian light distribution.

Note 11

The light source unit according to any one of notes 1-10, wherein the waveplate is a $\lambda/4$-plate.

Note 12

The light source unit according to any one of notes 1-11, wherein
the reflective polarizing element has a rectangular plate shape,
the normal of the waveplate is tilted with respect to the direction of the optical path in a direction in which a short side of the reflective polarizing element extends,
an angle between the normal of the waveplate and the direction of the optical path is defined by the following formula, wherein $\theta_0$ is the angle between the normal of the waveplate and the direction of the optical path, H is a length of the short side of the reflective polarizing element in a direction orthogonal to the direction of the optical path, and D is a distance between an intersection between the reflective polarizing element and the optical path and an intersection between the waveplate and the optical path:

$\theta_0 \geq 0.5 \times a \tan(H/2D)$.

Note 13

An image display device, comprising:
the light source unit according to note 2; and
a reflection unit reflecting light emitted from the light source unit,
the first image being formed between the light source unit and the reflection unit, a viewer being able to view a second image by light reflected by the reflection unit being reflected by a reflecting surface to be incident on an eyebox of the viewer,
the reflecting surface being arranged to face the eyebox,
the second image corresponding to the image.

Note 14

The image display device according to note 13, wherein
the normal of the waveplate is tilted with respect to the direction of the optical path so that light emitted from the display device, transmitted by the reflective polarizing element, and reflected by the waveplate does not enter the eyebox.

Note 15

An image display device, comprising:
the light source unit according to note 5; and
a reflection unit reflecting light emitted from the light source unit,
the first image being formed between the light source unit and the reflection unit,
a viewer being able to view a second image corresponding to the image by light reflected by the reflection unit being reflected by a reflecting surface to enter an eyebox of a viewer,
the reflecting surface being arranged to face the eyebox.

Note 16

The image display device according to note 15, wherein
the normal of the waveplate is tilted with respect to the direction of the optical path so that light emitted from the display device, reflected by the reflective polarizing element, and reflected by the waveplate does not enter the eyebox.

For example, the invention can be utilized in a head-up display (HUD), etc.

What is claimed is:

1. A light source unit comprising:
a display device configured to display an image;
a reflective polarizing element on which light emitted from the display device is incident, wherein the reflective polarizing element is configured to transmit a first polarized light and to reflect a second polarized light;
a reflecting member configured to reflect, toward the reflective polarizing element, light transmitted by the reflective polarizing element; and
a waveplate interposed in a portion of an optical path between the reflective polarizing element and the reflecting member, the optical path being of light emitted from the display device, transmitted by the reflective polarizing element, reflected by the reflecting member, and reflected by the reflective polarizing element; wherein:
a normal of the waveplate is tilted with respect to a direction of the optical path transmitted by the waveplate partway from the reflective polarizing element toward the reflecting member.

2. The light source unit according to claim 1, wherein:
the light emitted from the display device, transmitted by the reflective polarizing element, reflected by the reflecting member, and reflected by the reflective polarizing element forms a first image corresponding to the image;
an imaging optical system that includes the reflective polarizing element, the reflecting member, and the waveplate is substantially telecentric at a first image side; and
the light emitted from the display device has a substantially Lambertian light distribution.

3. The light source unit according to claim 1, wherein:
the normal of the waveplate is tilted with respect to the direction of the optical path so that the light emitted from the display device, transmitted by the reflective polarizing element, and reflected by the waveplate is not incident on the reflective polarizing element.

4. The light source unit according to claim 2, wherein:
the light emitted from the display device has a light distribution pattern in which a luminous intensity of the light emitted from the display device in a direction of an angle $\theta$ with respect to an optical axis of the light emitted from the display device is approximated by $\cos^n \theta$ times a luminous intensity at the optical axis; and
n is a value greater than 0.

5. The light source unit according to claim 4, wherein:
n is not more than 11.

6. The light source unit according to claim 1, wherein:
the display device is an LED display comprising a plurality of LED elements.

7. The light source unit according to claim 6, wherein:
light emitted from the LED element has a substantially Lambertian light distribution.

8. The light source unit according to claim 1, wherein:
the waveplate is a $\lambda/4$-plate.

9. The light source unit according to claim 1, wherein:
the reflective polarizing element has a rectangular plate shape;
the normal of the waveplate is tilted with respect to the direction of the optical path in a direction in which a short side of the reflective polarizing element extends; and
an angle between the normal of the waveplate and the direction of the optical path is defined by the following formula, in which $\theta_0$ is the angle between the normal of the waveplate and the direction of the optical path, H is a length of the short side of the reflective polarizing element in a direction orthogonal to the direction of the optical path, and D is a distance between an intersection between the reflective polarizing element and the optical path and an intersection between the waveplate and the optical path:

$$\theta_0 \geq 0.5 \times a\tan(H/2D).$$

10. An image display device comprising:
the light source unit according to claim 2; and
a reflection unit configured to reflect light emitted from the light source unit; wherein:
the first image is formed between the light source unit and the reflection unit;
a second image, corresponding to the image and viewable by a viewer, is formed by light reflected by the reflection unit being reflected by a reflecting surface to be incident on an eyebox of the viewer, the reflecting surface being arranged to face the eyebox.

11. The image display device according to claim 10, wherein
the normal of the waveplate is tilted with respect to the direction of the optical path so that light emitted from the display device, transmitted by the reflective polarizing element, and reflected by the waveplate does not enter the eyebox.

12. A light source unit comprising:
a display device configured to display an image;
a reflective polarizing element on which light emitted from the display device is incident, wherein the reflective polarizing element is configured to reflect a first polarized light and to transmit a second polarized light;
a reflecting member configured to reflect, toward the reflective polarizing element, light reflected by the reflective polarizing element; and
a waveplate interposed in a portion of an optical path between the reflective polarizing element and the reflecting member, the optical path being of light emitted from the display device, reflected by the reflective polarizing element, reflected by the reflecting member, and transmitted by the reflective polarizing element; wherein:
a normal of the waveplate is tilted with respect to a direction of the optical path transmitted by the waveplate partway from the reflective polarizing element toward the reflecting member.

13. The light source unit according to claim 12, wherein:
the light emitted from the display device, reflected by the reflective polarizing element, reflected by the reflecting member, and transmitted by the reflective polarizing element forms a first image corresponding to the image;
an imaging optical system that includes the reflective polarizing element, the reflecting member, and the waveplate is substantially telecentric at a first image side; and
the light emitted from the display device has a substantially Lambertian light distribution.

14. The light source unit according to claim 12, wherein:
the normal of the waveplate is tilted with respect to the direction of the optical path so that light emitted from the display device, reflected by the reflective polarizing element, and reflected by the waveplate is not incident on the reflective polarizing element.

15. The light source unit according to claim 13, wherein:
the light emitted from the display device has a light distribution pattern in which a luminous intensity of the light emitted from the display device in a direction of an angle $\theta$ with respect to an optical axis of the light emitted from the display device is approximated by $\cos^n \theta$ times a luminous intensity at the optical axis; and
n is a value greater than 0.

16. The light source unit according to claim 15, wherein:
n is not more than 11.

17. The light source unit according to claim 12, wherein:
the display device is an LED display comprising a plurality of LED elements.

18. The light source unit according to claim 17, wherein:
light emitted from the LED element has a substantially Lambertian light distribution.

19. The light source unit according to claim 12, wherein:
the waveplate is a $\lambda/4$-plate.

20. The light source unit according to claim 12, wherein:
the reflective polarizing element has a rectangular plate shape;
the normal of the waveplate is tilted with respect to the direction of the optical path in a direction in which a short side of the reflective polarizing element extends; and
an angle between the normal of the waveplate and the direction of the optical path is defined by the following formula, in which $\theta_0$ is the angle between the normal of the waveplate and the direction of the optical path, H is a length of the short side of the reflective polarizing element in a direction orthogonal to the direction of the optical path, and D is a distance between an intersection between the reflective polarizing element and the optical path and an intersection between the waveplate and the optical path:

$$\theta_0 \geq 0.5 \times a\tan(H/2D).$$

21. An image display device comprising:
the light source unit according to claim 12; and
a reflection unit configured to reflect light emitted from the light source unit; wherein:
the first image is formed between the light source unit and the reflection unit; and
a second image, corresponding to the image and viewable by a viewer, is formed by light reflected by the reflection unit being reflected by a reflecting surface to be incident on an eyebox of the viewer, the reflecting surface being arranged to face the eyebox.

22. The image display device according to claim 21, wherein:
the normal of the waveplate is tilted with respect to the direction of the optical path so that light emitted from the display device, reflected by the reflective polarizing element, and reflected by the waveplate does not enter the eyebox.

* * * * *